United States Patent
Leonardi et al.

(10) Patent No.: US 12,297,811 B2
(45) Date of Patent: May 13, 2025

(54) SYSTEM AND METHOD TO MAXIMIZE POWER PRODUCTION BY WIND TURBINES

(71) Applicant: Board of Regents, The University of Texas System, Austin, TX (US)

(72) Inventors: Stefano Leonardi, Richardson, TX (US); Mario Rotea, Allen, TX (US); Umberto Ciri, Dallas, TX (US); Federico Bernardoni, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 399 days.

(21) Appl. No.: 17/808,700

(22) Filed: Jun. 24, 2022

(65) Prior Publication Data
US 2022/0412307 A1  Dec. 29, 2022

Related U.S. Application Data

(60) Provisional application No. 63/214,675, filed on Jun. 24, 2021.

(51) Int. Cl.
| | |
|---|---|
| F03D 7/02 | (2006.01) |
| F03D 7/04 | (2006.01) |
| H02J 3/38 | (2006.01) |

(52) U.S. Cl.
CPC ............ F03D 7/028 (2013.01); F03D 7/048 (2013.01); H02J 3/381 (2013.01);
(Continued)

(58) Field of Classification Search
CPC ........ F03D 7/028; F03D 7/048; F03D 7/0204; F05B 2270/204; F05B 2270/321;
(Continued)

(56) References Cited

U.S. PATENT DOCUMENTS

| | | | | |
|---|---|---|---|---|
| 8,178,986 B2 * | 5/2012 | Vyas | ...................... | G06Q 10/04 290/44 |
| 9,175,669 B2 * | 11/2015 | Craig | ...................... | G06F 30/20 |

(Continued)

OTHER PUBLICATIONS

Bernardoni et al., "Identification of wind turbine clusters for effective real time yaw control optimization," Journal of Renewable and Sustainable Energy, vol. 13, Jul. 20, 2021, 18 pages. https://aip.scitation.org/doi/10.1063/5.0036640.

(Continued)

*Primary Examiner* — M. N. Von Buhr
(74) *Attorney, Agent, or Firm* — Yee & Associates, P.C.

(57) ABSTRACT

Enabling control of wind turbines is provided. The method comprises receiving power production signals from wind turbines comprising a wind farm and estimating wake travel times from upstream wind turbines to downstream turbines. Correlations of the power production signals are calculated among all pairs of wind turbines in the wind farm. Wind turbines with a power production correlation above a specified threshold at an expected time are considered to have wake interaction. A probability density function of northing directions is calculated for the wind turbine pairs with wake interaction. A determination is made whether the probability density function has a dominant direction. Responsive to the probability density function having a dominant direction, the wind turbine pairs with wake interaction are identified as turbine clusters. A control strategy is applied to each turbine cluster as an operational unit to optimize power production of the wind farm.

20 Claims, 17 Drawing Sheets

(52) U.S. Cl.
CPC . *F05B 2270/1033* (2013.01); *F05B 2270/321* (2013.01); *H02J 2300/28* (2020.01)

(58) Field of Classification Search
CPC ........ F05B 2270/335; F05B 2270/1033; H02J 3/381; H02J 2300/28; G06Q 10/04; G06Q 10/063; G06Q 50/06; Y02E 10/72
See application file for complete search history.

(56) References Cited

U.S. PATENT DOCUMENTS

| | | | | |
|---|---|---|---|---|
| 9,399,981 | B2* | 7/2016 | Craig | F03G 7/00 |
| 9,460,478 | B2* | 10/2016 | Zhang | H02J 3/004 |
| 9,551,322 | B2* | 1/2017 | Ambekar | G05B 13/048 |
| 10,267,292 | B2* | 4/2019 | Ma | F03D 7/048 |
| 11,371,484 | B2* | 6/2022 | Hamilton | G01W 1/10 |
| 12,037,985 | B2* | 7/2024 | Gebraad | F03D 7/048 |
| 2009/0099702 | A1* | 4/2009 | Vyas | F03D 7/0292 |
| | | | | 290/55 |
| 2012/0133138 | A1* | 5/2012 | Sorensen | H02J 3/46 |
| | | | | 290/44 |
| 2022/0285945 | A1* | 9/2022 | Hovgaard | H02J 3/381 |
| 2023/0272775 | A1* | 8/2023 | Post | F03D 7/048 |
| | | | | 290/44 |
| 2023/0349359 | A1* | 11/2023 | King | F03D 7/046 |

OTHER PUBLICATIONS

Bernardoni, "Real-time identification of clusters of turbines," Journal of Physics: Conference Series, vol. 1618, Sep. 2020, 11 pages. https://iopscience.iop.org/article/10.1088/1742-6596/1618/2/022032/pdf.

* cited by examiner

| $P/P_{rated}$ | $\theta = 0°$ | $\theta = 30°$ | $\theta = 60°$ | $\theta = 90°$ |
|---|---|---|---|---|
| T01 | 0.47 | 0.49 | 0.49 | 0.51 |
| T02 | 0.52 | 0.49 | 0.54 | 0.11 |
| T03 | 0.51 | 0.54 | 0.55 | 0.12 |
| T04 | 0.50 | 0.54 | 0.54 | 0.16 |
| T05 | 0.13 | 0.54 | 0.50 | 0.49 |
| T06 | 0.12 | 0.24 | 0.52 | 0.10 |
| T07 | 0.12 | 0.20 | 0.51 | 0.11 |
| T08 | 0.12 | 0.28 | 0.35 | 0.15 |
| T09 | 0.13 | 0.49 | 0.47 | 0.49 |
| T10 | 0.15 | 0.23 | 0.51 | 0.11 |
| T11 | 0.14 | 0.26 | 0.52 | 0.13 |
| T12 | 0.15 | 0.24 | 0.36 | 0.16 |
| T13 | 0.15 | 0.52 | 0.53 | 0.48 |
| T14 | 0.16 | 0.21 | 0.53 | 0.11 |
| T15 | 0.16 | 0.24 | 0.52 | 0.13 |
| T16 | 0.16 | 0.25 | 0.33 | 0.16 |

FIG. 15

SYSTEM AND METHOD TO MAXIMIZE POWER PRODUCTION BY WIND TURBINES

CROSS-REFERENCE TO RELATED APPLICATION

This application is a utility conversion and claims priority to U.S. Ser. No. 63/214,675, filed Jun. 24, 2021, the contents of which are incorporated herein by reference in their entirety for all purposes.

STATEMENT OF GOVERNMENT INTEREST

This invention was made with government support under award number CMMI1839733 awarded by the National Science Foundation. The government has certain rights in the invention.

BACKGROUND INFORMATION

1. Field

The present disclosure relates generally to wind farms, and more specifically identifying and controlling operational clusters of wind turbines within wind farms.

2. Background

Turbines in a wind farm do not operate in isolated conditions due to wake interactions. A change in the operation of an upstream turbine may affect the efficiency and the power production of downstream turbines. It is well-known that wake interactions play an important role in the overall power production of a wind farm, and these interactions are likely to change with variations in wind conditions.

Therefore, it would be desirable to have a method and apparatus that take into account at least some of the issues discussed above, as well as other possible issues.

SUMMARY

An illustrative embodiment provides a computer-implemented method enable control of wind turbines. The method comprises receiving power production signals from wind turbines comprising a wind farm and estimating wake travel times from upstream wind turbine positions to downstream wind turbine positions in the wind farm. Correlations of the power production signals are calculated among all pairs of wind turbines in the wind farm. Wind turbines with a power production correlation above a specified threshold at an expected time are considered to have wake interaction. A probability density function of northing directions is calculated for the wind turbine pairs with wake interaction. A determination is made whether the probability density function has a dominant direction. Responsive to the probability density function having a dominant direction, the wind turbine pairs with wake interaction are identified as turbine clusters. A control strategy is applied to each turbine cluster as an operational unit to optimize power production of the wind farm.

Another illustrative embodiment provides a method of enabling control of wind turbines. The method comprises estimating a time for wakes to travel from upstream wind turbines in the wind farm to downstream wind turbines in the wind farm. Power production signals are correlated among wind turbines comprising a wind farm. Wind turbine pairs in the wind farm with wake interaction are identified. Wake interaction comprises a distance between wind turbines of less than 12 rotor diameters and a power production correlation above a specified threshold at an expected time. A probability density function of northing directions is calculated for the wind turbine pairs with wake interaction, and a determination is made as to whether the probability density function has a dominant direction. Wind turbine pairs with wake interaction form turbine clusters when the probability density function has a dominant direction. A control strategy is applied to each identified turbine cluster as an operational unit within the wind farm to optimize overall power production of the wind farm.

Another illustrative embodiment provides a computer system for enabling control of wind turbines. The computer system comprises a storage device that stores program instructions and a number of processors units in communication with the storage device, wherein the number of processor units executes program instructions to: receive power production signals from wind turbines comprising a wind farm; estimate wake travel times from upstream wind turbine positions to downstream wind turbine positions in the wind farm; compute correlations of the power production signals among all pairs of wind turbines in the wind farm, wherein wind turbines with a power production correlation above a specified threshold at an expected time are considered to have wake interaction; calculate a probability density function of northing directions of the wind turbine pairs with wake interaction; determine whether the probability density function has a dominant direction; responsive to the probability density function having a dominant direction, identify the wind turbine pairs with wake interaction as turbine clusters; and apply a control strategy to each turbine cluster as an operational unit to optimize power production of the wind farm The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 depicts a table of power correlations between wind turbine pairs according to incident wind angle;

DETAILED DESCRIPTION

Figure 1:
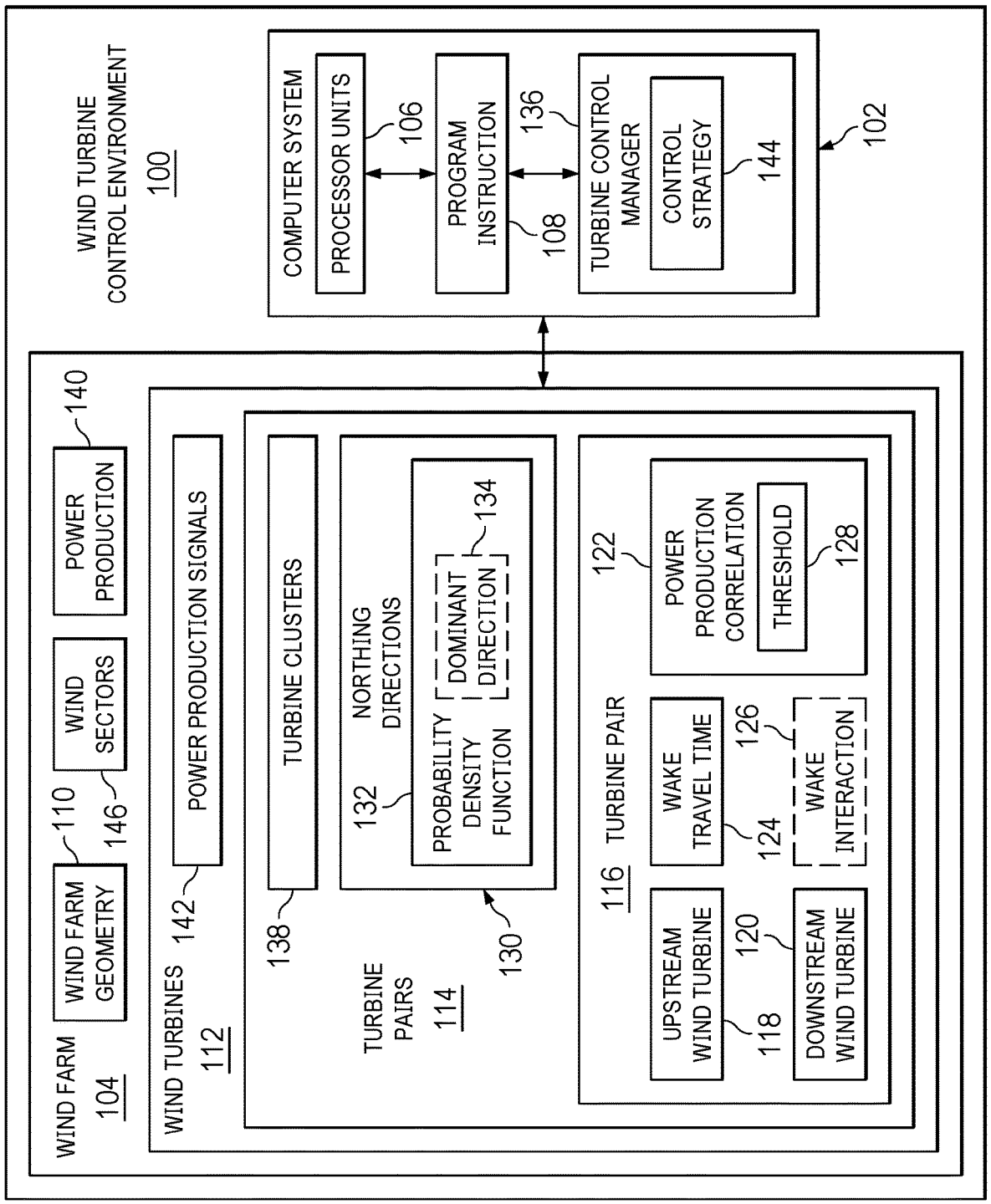
FIG. 1 depicts a block diagram of a wind turbine control environment in accordance with an illustrative embodiment.

The different illustrative embodiments recognize and take into account one or more different considerations. For example, the illustrative embodiments recognize and take into account that turbines in a wind farm do not operate in isolated conditions due to wake interactions. A change in the operation of an upstream turbine may affect the efficiency and the power production of downstream turbines.

The illustrative embodiment also recognize and take into account that wake interactions play an important role in the overall power production of a wind farm, and these interactions are likely to change with variations in wind conditions. For example, Clifton et al. reported that the variability of the wind conditions is one of the major causes associated with power losses due to the wake effects, while Port'e-Agel et al. showed through Large Eddy Simulations (LES) that a change in the wind direction as small as 10° from the worst-case full-wake condition may increase the total output power as much as 43% for the Horns Rev offshore wind farm. Mortensen et al. estimated an energy loss due to wake interaction between 6% and 10% for two wind farms operating onshore, and between 8% and 14% for two offshore wind farms in the Irish Sea. Barthelmie et al. showed that the power loss of downstream turbines can reach up to 30% in the worst-case scenario for the Horn Revs wind farm in Denmark.

Although new wind farms layout optimization may mitigate the power losses due to wake interactions, the variability of the wind direction prevents from a complete elimination of such interactions and the associated power losses.

Control strategies have been developed to mitigate the wake interaction and maximize the power production of the farm. Using a data-driven parametric model, Gebraad et al. presented a control strategy based on the yaw control of the upstream turbines. These authors exploited the wake lateral deflection caused by the misalignment between the incoming wind and the rotor plane to steer the wake away from the downstream turbine and thus increase the overall power production of a two-turbine cluster. Fleming et al. investigated strategies to redirect turbine wakes such as yaw and tilt actuation in order to have a more energetic flow impinging on the downstream turbines. Ciri et al. demonstrated using LES the possible reduction of the power losses using Extremum Seeking Control (ESC) of the yaw angle for a two-turbine cluster. Recent field studies have demonstrated that the application of wake steering control strategies is able to increase the power production of two-turbine clusters up to 4%. In these studies, the wind direction is known and constant, so that turbines that are coupled by the wake interaction, hereafter turbine clusters, can be determined a priori and do not change in time. In reality the wind changes direction and therefore the clusters of turbines must be determined in real time. An efficient application of coordinated control strategies requires the detection of the clusters in real time.

The wake direction is mainly affected by the wind direction. Hence, a possible strategy for the identification of the turbine clusters could be based on the geometry of the wind farm and the accurate detection of the wind direction. Since the wind direction may vary within a large wind farm due to atmospheric meso-scale structures and local turbulence, the use of a few isolated external instruments such as meteorological tower or LIDAR scans can lead to erroneous assumptions for the regions of the wind farm that are far from them. To increase the accuracy of the wind direction measurements, Annoni et al. developed a consensus-based approach able to incorporate Supervisory Control And Data Acquisition (SCADA) data from multiple turbines in every region of the wind farm. However, in case of yaw misalignment the wind direction may not be a reliable indicator of the wake direction. Thus, the use of wind direction as the sole indicator for detecting clusters of aerodynamically coupled turbines may not yield accurate results. Hence, it is desirable to develop a tool for the identification of clusters of coupled turbines with the ability to promptly adapt to changes in wind direction and turbine yaw angles.

The illustrative embodiments provide a method to detect clusters of turbines coupled by the wake interaction through the correlations of the power production of each turbine. Instead of using wind direction or speed, the signal quantifying the actual power produced by each turbine is taken into account. An ideal wind farm of 16 wind turbines is simulated using our in-house large eddy simulation code coupled with the rotating actuator disk. The resulting "virtual" SCADA data are then used to correlate the power production of each pair of turbines in the array and determine the clusters of turbines.

With reference now to FIG. 1, a block diagram of a wind turbine control environment is depicted in accordance with an illustrative embodiment. In this illustrative example, wind turbine control environment 100 comprises a number of wind turbines 112 in a wind farm 104. As depicted, computer system 102 is in communication with wind turbines 112 and manages wind turbines 112 in wind farm 104.

In one illustrative example, wind turbines 112 may be all wind turbines in wind farm 104. In some other embodiments, wind turbines 112 may comprise a subset of all wind turbines for wind farm 104.

Wind farm 104 has a wind farm geometry 110 representing the layout of wind turbines 112 in the wind farm 104. In some illustrative examples, the wind farm geometry 110 may be a turbine grid design with a streamwise direction, which is along the wind direction. In an alternative example, the wind farm geometry 110 may be a turbine grid design with a spanwise direction, which is orthogonal to wind direction.

Wind turbines 112 may be divided into a number of turbine pairs 114. Each turbine pair 116 may include an upstream wind turbine 118 and a downstream wind turbine 120. The wind can be assumed to come from any direction. In some illustrative examples, wind direction can be represented by a numerical value ranging, for example, from −180° to 180°, or from 0° to 360° as long as the specified intervals are able to describe any direction where the wind rose.

The upstream wind turbine 118 and downstream wind turbine 120 may have wake interaction 126 between the two turbines. Wakes are regions of the air flow that propagate behind wind turbines. Since each wind turbine extracts energy from incoming wind, the air flow going past the wind turbines has less kinetic energy, which results in a reduction in the wind speed. When a downstream turbine is positioned in the wake of an upstream turbine, the downstream turbine has a lower amount of kinetic energy to extract from wind and subsequently causes reduction in overall power production 140 from wind farm 104.

In this illustrative example, the potential wake interaction 126 between upstream wind turbine 118 and downstream wind turbine 120 for turbine pair 116 can be determined by calculating the power production correlation 122 between power production signals 142 generated by wind turbines 112. In some illustrative examples, the wind turbines in each turbine pair 116 are considered to have wake interaction 126 when the wind turbines have a power production correlation 122 above a specified threshold 128. The specified threshold 128 may be a value defined manually based on user preference or automatically calculated based on the wind condition and wind turbines condition in real-time.

Turbine pair 116 further includes a wake travel time 124 between upstream wind turbine 118 and downstream wind turbine 120. In this illustrative example, wake travel time 124 can be computed as a ratio of distance between upstream wind turbine 118 and downstream wind turbine 120 to wake propagation velocity. In some examples, the wake propagation velocity can be estimated using statistical methods such as average and standard deviation of wake travel time or probability density function of the wake travel time from the upstream wind turbine of a turbine pair to the downstream wind turbine of turbine pair. Here, it has been shown that the wake propagation velocity has an average velocity that corresponds to 0.8 times the free stream velocity ($U_{free}$) of the incoming wind with a standard deviation of 0.09 $U_{free}$. The travel time of the wakes is then expected to be between $t1=d/((0.8+3*(0.09))U_{free})$ and $t2=d/((0.8-3*(0.09))U_{free})$. 0.8 is a universal number that can be used in every situation. Note that we use the standard deviation to mitigate the uncertainty on 0.8. In other words, the formula above takes into consideration velocities ranging from 0.8−0.27 to 0.8+0.27, so there is a very high confidence that the wake velocity is in this range. The free-stream velocity is the velocity of the wind upstream of the wind farm 104. The free-stream velocity can be measured by the most upstream turbines (i.e., the turbines with the highest power production) through the anemometer. In this example, the average free-stream velocity of the turbines can also be estimated from the upstream turbine power production given the power curve of the wind turbines 112. The convection velocity is the average velocity at which turbine wakes propagate within the wind farm 104.

Wake travel time 124 can be used in determining the presence of wake interaction 126 when the power production correlation 122 exceeds the specified threshold 128 at the expected time for the wake to arrive at the downstream wind turbine 120.

Figure 9:
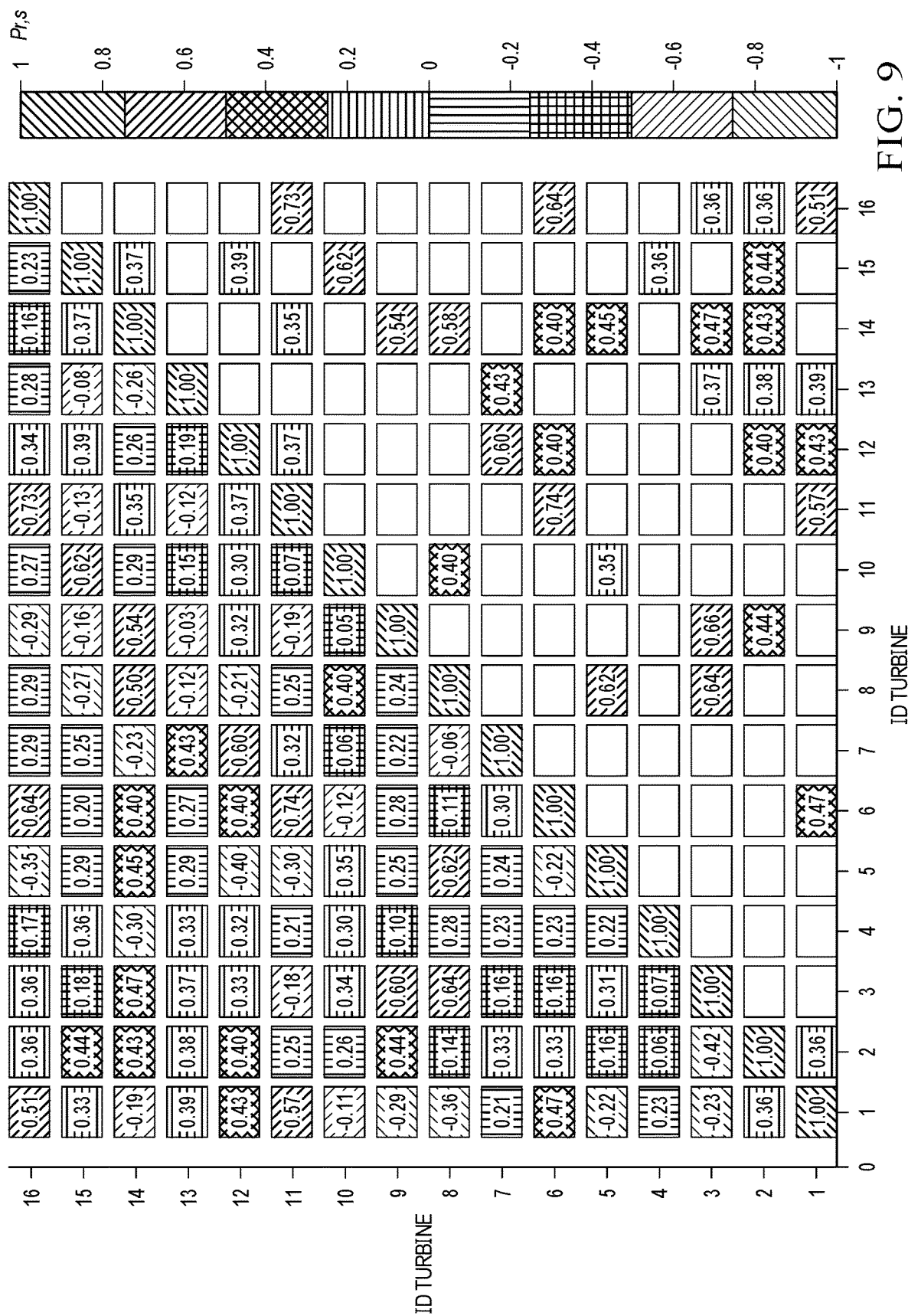
FIG. 9 depicts a matrix of power correlation coefficients between turbine pairs in a wind farm with 30° incident wind.
Figure 11:
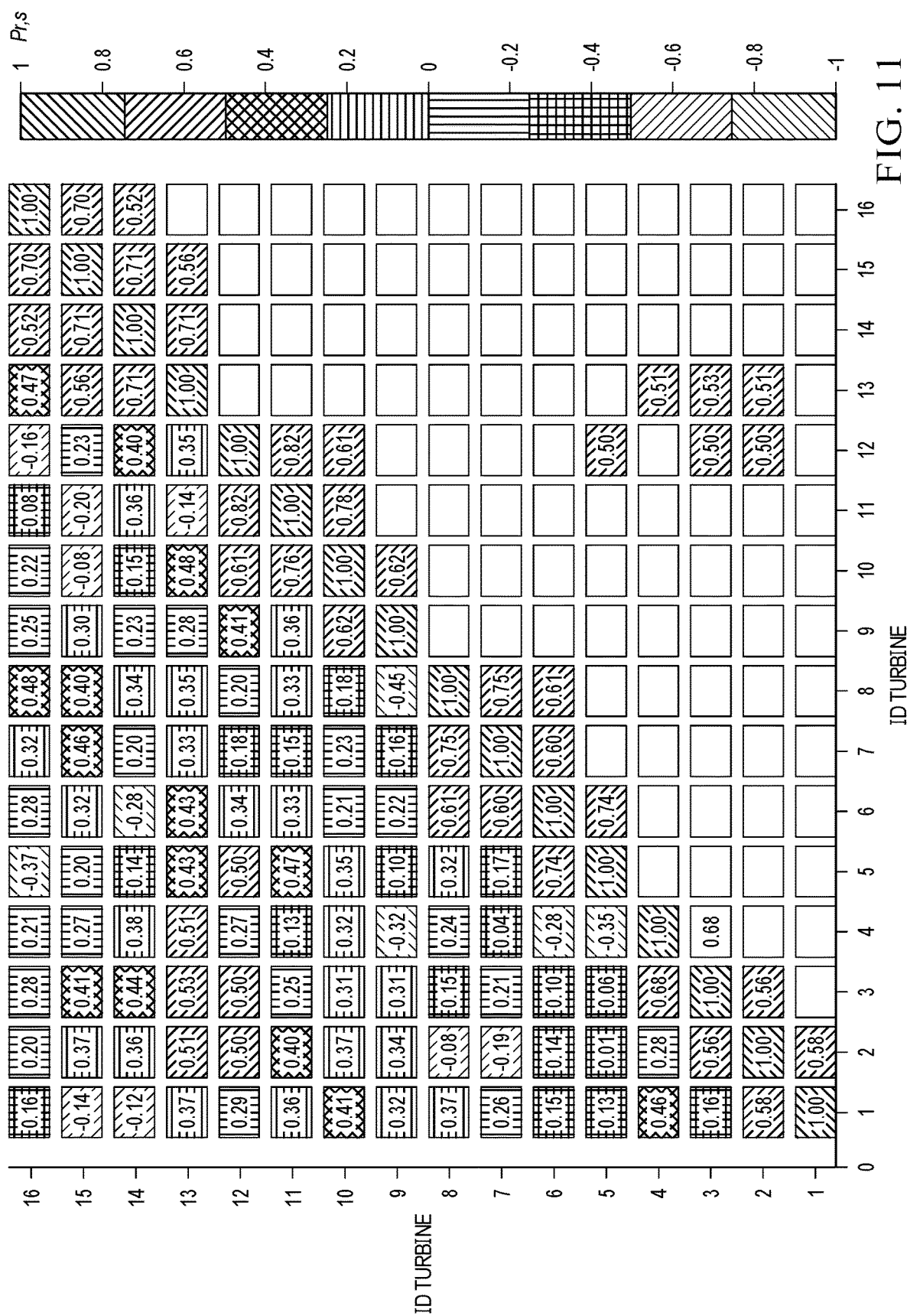
FIG. 11 depicts a matrix of power correlation coefficients between turbine pairs in a wind farm with 90° incident wind.

Turbine pairs 114 have northing directions 130, which can be determined by an angle of a line that links the turbines with respective to the "north" direction of the wind farm 104 (e.g., see FIGS. 9 and 11). A Probability density function 132 can be computed for northing directions 130 of all turbine pairs 114 that have wake interaction. Computation of the probability density function 132 of northing directions 130 allows the selection of most probable wake direction within the wind farm 104.

The probability density function 132 may further have a dominant direction 134. A dominant direction 134 is the direction to which most of the turbine pairs with wake interaction are aligned. Dominant direction 134 corresponds to the angle where the probability density function 132 of northing directions 130 reaches its maximum. In this example, all turbine pairs 114 that have the dominant direction are identified as comprising turbine clusters 138.

Probability density function 132 counts the number of northing directions associated with correlated turbine pairs in each wind sector 146 (in this example 10° wind sectors). The peak in the probability density function indicates the dominant wake interaction direction. If the probability density function does not have a dominant direction, then there is no wake interaction in the wind farm and therefore no clusters are identified.

In this illustrative example, an optimization can be performed for wind farm 104 when turbine clusters 138 are identified. For example, an optimization of cumulative power production of turbine clusters 138 as a whole can be performed instead of optimizing power production of each turbine within wind turbines 112. The optimization of turbine clusters 138 can be achieved using a control strategy 144 such as, for example, intentional yaw misalignment of upstream turbines for wake steering, or intentional derating of upstream turbines to increase the power production of downstream turbines.

Wind turbine control environment 100 includes a computer system 102. As depicted, computer system 102 comprises turbine control manager 136. Turbine control manager 136 can implement a control strategy 144 to manage and control wind turbines 112. In this example, turbine control manager 136 can optimize energy production of wind turbines 112. Turbine control manager 136 can also analyze and process information gathered from wind turbines 1126 for the purpose of optimizing wind farm power production 140.

Turbine control manager 136 can be implemented in software, hardware, firmware or a combination thereof. When software is used, the operations performed by turbine control manager 136 can be implemented in program instructions configured to run on hardware, such as a processor unit. When firmware is used, the operations performed by turbine control manager 136 can be implemented in program instructions and data and stored in persistent memory to run on a processor unit. When hardware is employed, the hardware can include circuits that operate to perform the operations in turbine control manager 136.

Computer system 102 is a physical hardware system and includes one or more data processing systems. When more than one data processing system is present in computer system 102, those data processing systems are in communication with each other using a communications medium. The communications medium can be a network. The data processing systems can be selected from at least one of a computer, a server computer, a tablet computer, or some other suitable data processing system.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, computer system 102 includes a number of processor units 106 that are capable of executing program instructions 108 implementing processes in the illustrative examples. As used herein a processor unit in the number of processor units 106 is a hardware device and is comprised of hardware circuits such as those on an integrated circuit that respond and process instructions and program code that operate a computer. When a number of processor units 106 execute program instructions 108 for a process, the number of processor units 106 is one or more processor units that can be on the same computer or on different computers. In other words, the process can be distributed between processor units on the same or different computers in a computer system. Further, the number of processor units 106 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

The filtered non-dimensional governing equations for incompressible flow are:

$$\frac{\partial U_i}{\partial x_i} = 0 \tag{1a}$$

$$\frac{\partial U_i}{\partial t} + \frac{\partial U_i U_j}{\partial x_j} = \frac{\partial P}{\partial x_i} + \frac{1}{Re}\frac{\partial^2 U_i}{\partial x_j \partial x_j} - \frac{\partial \tau_{ij}^{sgs}}{\partial x_j} + F_i \tag{1b}$$

where $U_i$ is the $i^{th}$ component of the filtered velocity vector, P is the filtered modified pressure, $R_e = U_{ref} D/\nu$ is the Reynolds number, $\nu$ is the kinematic viscosity, $\tau_{ij}^{sgs}$ is the subgrid stress tensor, and $F_i$ is the body force that accounts for the effects of the turbines on the aerodynamic field. Details of the numerical code are in Orlandi and Leonardi and Santoni et al. The forces of the rotor acting on the flow are reproduced using the rotating actuator disk model. The disk rotates in time with the instantaneous rotational speed of the turbine $\omega$ determined through the angular momentum balance between the aerodynamic torque $T_{aero}$ and the generator torque $M_{gen}$:

$$I\dot{\omega} = T_{aero} - M_{gen} \tag{2}$$

where I is the rotor inertia. The generator torque is determined through a standard region II control law, where the generator torque is taken proportional to the square of the generator speed:

$$M_{gen} = k_{gen} \cdot \omega_{gen}^2 \tag{3}$$

where $\omega_{gen} = N_g \cdot \omega$ is the high-speed shaft angular velocity, $N_g$ the gear ratio ($N_g$=97). In equilibrium ($\dot{\omega}$=0), the operating rotational speed is determined by the value of the torque gain $k_{gen}$. To achieve maximum efficiency the torque gain is taken to be:

$$k_{gen} = \frac{1}{N_g^2}\frac{1}{2}\rho\pi R^5 \frac{C_p(\lambda_{opt})}{\lambda_{opt}^3} = 2.2 \, Nm/rpm^2$$

where $\lambda_{opt}$=7.5 for the NREL 5-MW reference turbine, R is the radius of the turbine and $C_P$ is the maximum power coefficient of the turbine. We regard the torque gain in equation (4) as the baseline design value.

The computational box in streamwise direction (along the wind direction) and spanwise direction (orthogonal to wind direction) is 24D and 19.2D respectively. The distance of the first row of turbines from the inlet is 4D to minimize numerical reflection of the induction zone, while the last row of turbines is at 5D from the outlet. The vertical size of the domain is kept constant and equal to 10D. The grid is stretched in the vertical direction in order to have a finer grid resolution in the region with the turbines. The grid resolution in the region of the turbines is uniform in all directions, $\Delta_x = \Delta_z = \Delta_y = 0.025D$.

No-slip conditions are applied at the bottom boundary of the domain, on the nacelles and the towers of the turbines. Free-slip conditions are applied at the top boundary of the computational domain. Periodic boundary conditions are imposed at the two spanwise sides of the domain and radiative boundary conditions at the outlet. In order to reproduce the atmospheric boundary layer at the inlet, turbulence obtained from a precursor simulation is superimposed to the mean velocity profile:

$$\frac{U}{U_{hub}} = \left(\frac{y}{y_{hub}}\right)^\alpha \tag{5}$$

where y is the vertical coordinate, $y_{hub}$, is the hub height and $\alpha$ is the shear exponent set to $\alpha$=0.05. The streamwise component of the wind velocity at height y is denoted by U and $U_{hub} = U_{ref}$ is the mean streamwise component of the wind velocity at the hub height. From the superposition of the mean flow of equation (5) and the turbulence from the precursor, the resulting turbulence intensity at the hub height impinging the first row of turbines is equal to 11%.

Figure 2:
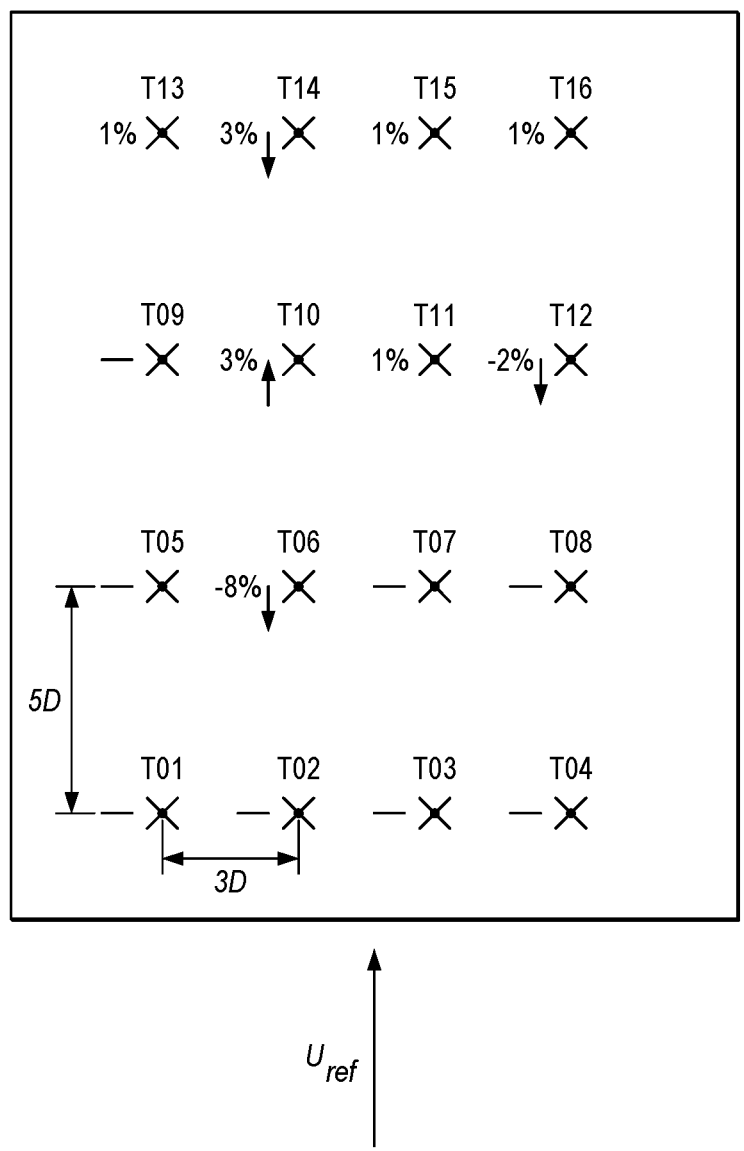
FIG. 2 depicts a diagram illustrating variation of power production in a wind farm.

A "digital" wind farm composed of 16 NREL-5MW reference turbines, arranged in 4 rows and 4 columns, is considered. The turbines have a rotor diameter D=126 m, rated wind speed $U_{rated}$=11.4 m/s and rated power $P_{rated}$=5MW. The turbine spacing in the transversal direction (West-East) is 3D, while in the longitudinal direction (South-North) the spacing is 5D as shown in FIG. 2. The average wind speed at the hub height is equal to Uref=0.8Urated.

A change on the operating condition on one turbine could potentially affect all the other 15 turbines. To illustrate the concept we performed a numerical experiment. All turbines of the wind farm operate at their optimal torque gain (baseline case). The torque gain of turbine T06 is instantaneously increased by 45% with respect to the baseline. T06 was chosen because it is located close to center of the wind farm and consequently it can potentially affect a larger number of turbines. However, the same experiment could be repeated with other turbines. An increase of torque gain, for a constant incoming velocity leads to a decrease of the angular speed of the turbine, reduction of the TSR (tip-speed ratio) and then of the power production (−8% as shown in FIG. 2; horizontal solid lines indicate that the power variation is less than 1%.). Due to the non-optimal torque gain imposed to T06 the momentum (or energy) extracted by this turbine is smaller and consequently the mean velocity of its wake is larger. A more energetic flow impinges on T10 leading to the 3% increase of its power production. Conversely, T14 faces a slightly slower flow with respect to the baseline case and produces less energy.

Smaller variations of the power production are experienced by other turbines that are not directly downstream of T06. Given the elliptical nature of the governing equations, the presence of free-stream turbulence and wake instability phenomena such as wake meandering can cause the propagation of a disturbance in spanwise direction. When a variation of the angular speed of a turbine is imposed, the interaction of its wake with the free-stream turbulence may change with a consequent propagation of the disturbance to turbines not aligned with the wind direction. Upstream turbines are very weakly influenced by a change on a downstream turbine. In fact, despite that the equations are elliptic in space, the convective terms dominate over the diffusive terms, and the equations are almost parabolic lending justification to the dynamic programming of Rotea.

The variation of power production for turbines outside the wake of the upwind turbine is smaller and it is highly dependent on the turbulence intensity. Turbines affected significantly by a change in the operating conditions of another turbine can be defined to belong to the same "cluster". On the other hand, a perturbation to a turbine belonging to a particular cluster, to a reasonable approximation, does not influence turbines belonging to a different cluster.

In this paper we propose an approach based on each turbine's response to wind velocity fluctuations in the incoming wind. The wind velocity impinging the turbine rotor, and as a consequence the power production of the turbine, fluctuates in time. Because turbulence is, to a good approximation, transported by the wake (Taylor hypothesis), we expect that turbines belonging to the same cluster (i.e., in each other's wakes) would have highly correlated power time series.

To test this hypothesis we performed a numerical experiment. Assume the wind farm is at steady state with each turbine working in ideal conditions. Let us increase the inlet velocity in front of T02 (see FIG. 2) by 10% for about 20 non-dimensional time units and then reduce it to its original value. Because the inlet is at a distance of 4D from the first row of turbines, after $t \simeq 4D/U_{ref}$, the wind with increased momentum starts impinging on T02. The aerodynamic torque increases, and the turbine adjusts its rotor angular speed to a higher value. The power production, which is proportional to the cube of the incoming velocity $P \simeq 1/2 \rho U_{ref}^3 C_p A$, increases by about 30% (due to the 10% increase in wind speed). The wake of T02 has also more energy because of the increased inlet wind speed, and when it reaches T06, the power production increases too, about 20-25%. The increase of power in the two turbines does not occur at the same time but there is a delay $\tau^*$ between the instants at which the power rises due to the time it takes for the wake to propagate from T02 to T06.

Let us evaluate the correlation between the power time series corresponding to T02 and T06. The correlation coefficient of the power production of each pair (r, s) of turbines is defined as $$\rho_{r,s}(\tau) = \frac{\sum_{i=1}^{N}(P_r(t_i) - \overline{P_r})(P_s(t_i + \tau) - \overline{P_s})}{\sqrt{\sum_{i=1}^{N}(P_r(t_i) - \overline{P_r})^2 \sum_{i=1}^{N}(P_s(t_i + \tau) - \overline{P_s})^2}} \quad (6)$$

where t is time and $\tau$ is the correlation time lag. The number of time samples is denoted by N, which is also the number of samples used to calculate the time-averaged quantities (denoted with overlines), and $P_j$ denotes the power production of the $j^{th}$ turbine.

It takes about $\tau^*=7$ non-dimensional time units for the wake to propagate between the aerodynamically coupled turbines T02 and T06. The correlation coefficient between these two turbines is maximized at $\tau^*=7$, approximately. This simple example suggests that turbine pairs with high correlation coefficients belong to the same cluster.

It should be noted that large coherent turbulent structures in the incoming wind can induce correlation in the power production of turbines that do not belong to the same cluster. The detection of such coherent flow structures is extremely difficult to perform in real time. Given the random nature of the turbulence, their contribution to the power correlation is filtered out when very long time-series of data are taken into account (very large value of N in equation (6)). For practical applications in real-time it is unfeasible to use long averaging times. For this reason, the following analysis uses 30 minutes of power production data ($N \simeq 2800$ in this set of simulations). Note that moving averages of finite duration can be employed to track cluster variations over time, as long as the time window allows real-time computation of correlation coefficients. In order to filter out large coherent turbulent structures, the physical properties of the wake can be used. Given the transport of turbulence in the wake, the correlation should be maximum for a time lag $\tau^*$, which is the time a disturbance on the upstream turbine takes to reach the downstream turbine. The time lag can be calculated as $\tau^*=d/U_c$, where d is the distance between the turbines and $U_c$ is the convection velocity, which can be thought as the average velocity at which a disturbance travels in the wake from the upstream to the downstream turbine.

Figure 3:
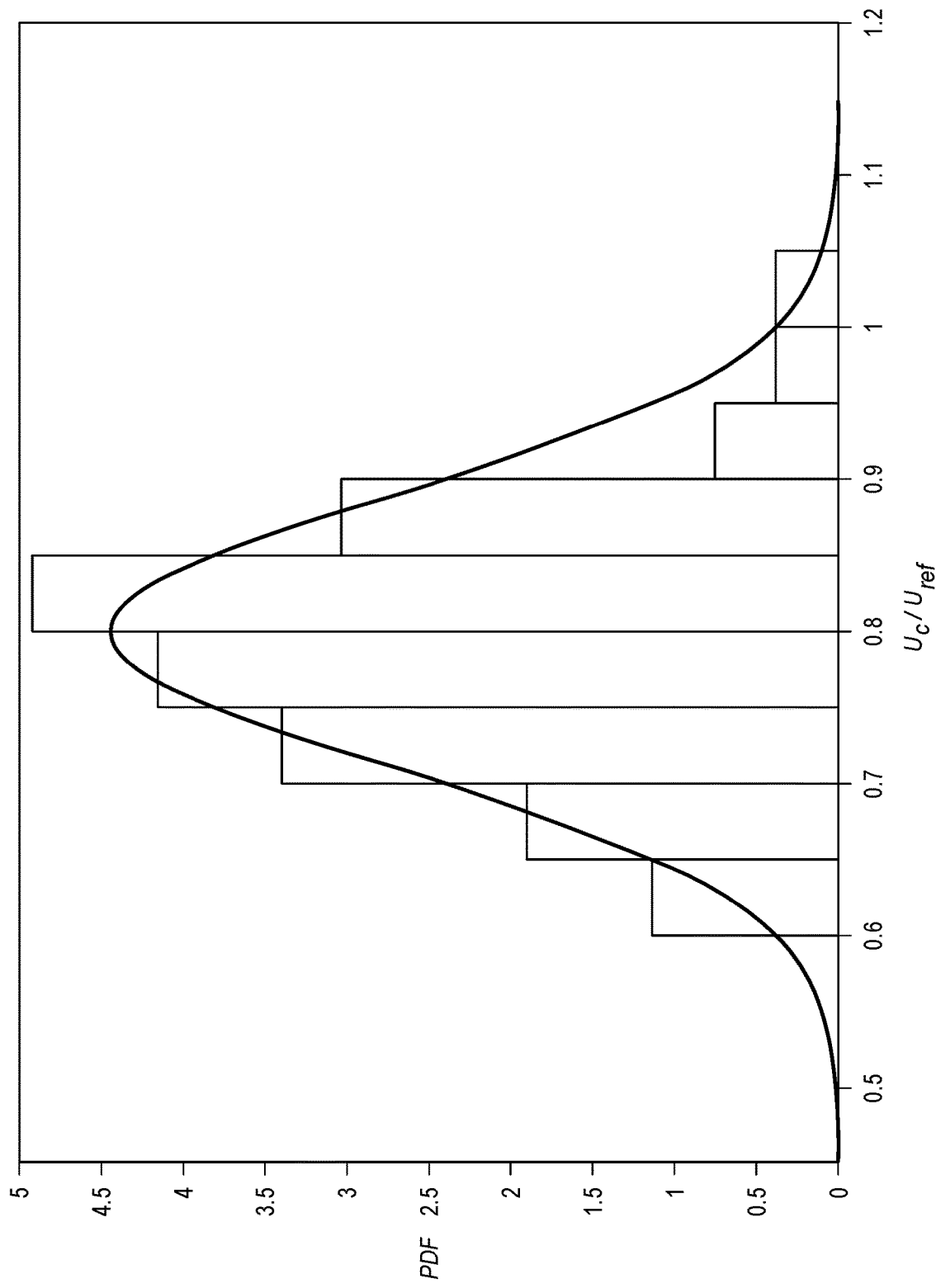
FIG. 3 depicts a chart of probability density of the ratio between convection velocity and free-stream velocity.
Figure 4:
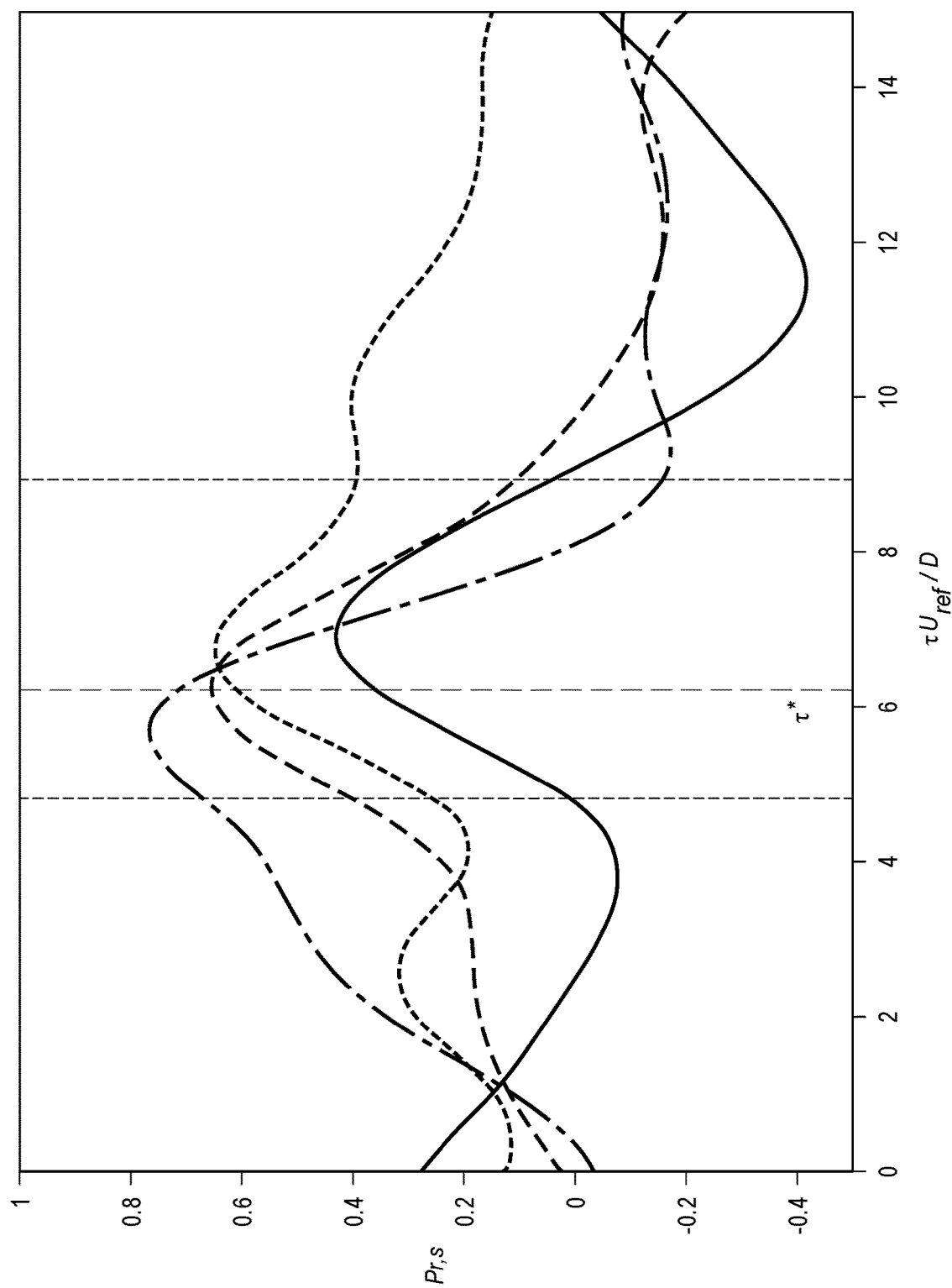
FIG. 4 depicts a chart of power production correlation coefficient variation with time lag.

The convection velocity depends on the momentum deficit at the turbine, i.e., the thrust coefficient. We computed the convection velocity Uc for a large database of cases. FIG. 3 shows the Probability Density Function (PDF) of the ratio Uc/Uref. The vertical bars represent the PDF obtained from the simulations while the solid black line is the best-fit normal distribution. As an example, FIG. 4 shows the plot of the correlation coefficient for four pairs of turbines separated by a distance of 5D (site specific values of the convection velocity may be calculated using the power and wind velocity from SCADA). We found that, in design condition, it can be assumed µU=Uc/Uref≃0.8 with a standard deviation of #$=0.09. This is consistent with Ciri et al. who found Uc≃0.7Uref.

The shadowed area in FIG. 4 corresponds to the time-lag interval where the peaks of correlation are expected to occur. A high correlation occurring for a time delay outside the shadowed area is unlikely to be due to wake interaction but rather to coherent structures in the flow. Therefore, by computing the correlation coefficient in equation (6) only for time delay in the interval $\tau \in [d/((\mu_U+3\sigma_U) U_{ref}), d/((\mu_U-3\sigma_U) U_{ref})]$ we filter out all the coherent structures in the atmospheric boundary layer with a time scale different than $\tau^*$, and eliminate possible outliers, i.e., turbines coupled not through the wake but because of the coherence in the incoming flow.

Figure 5:
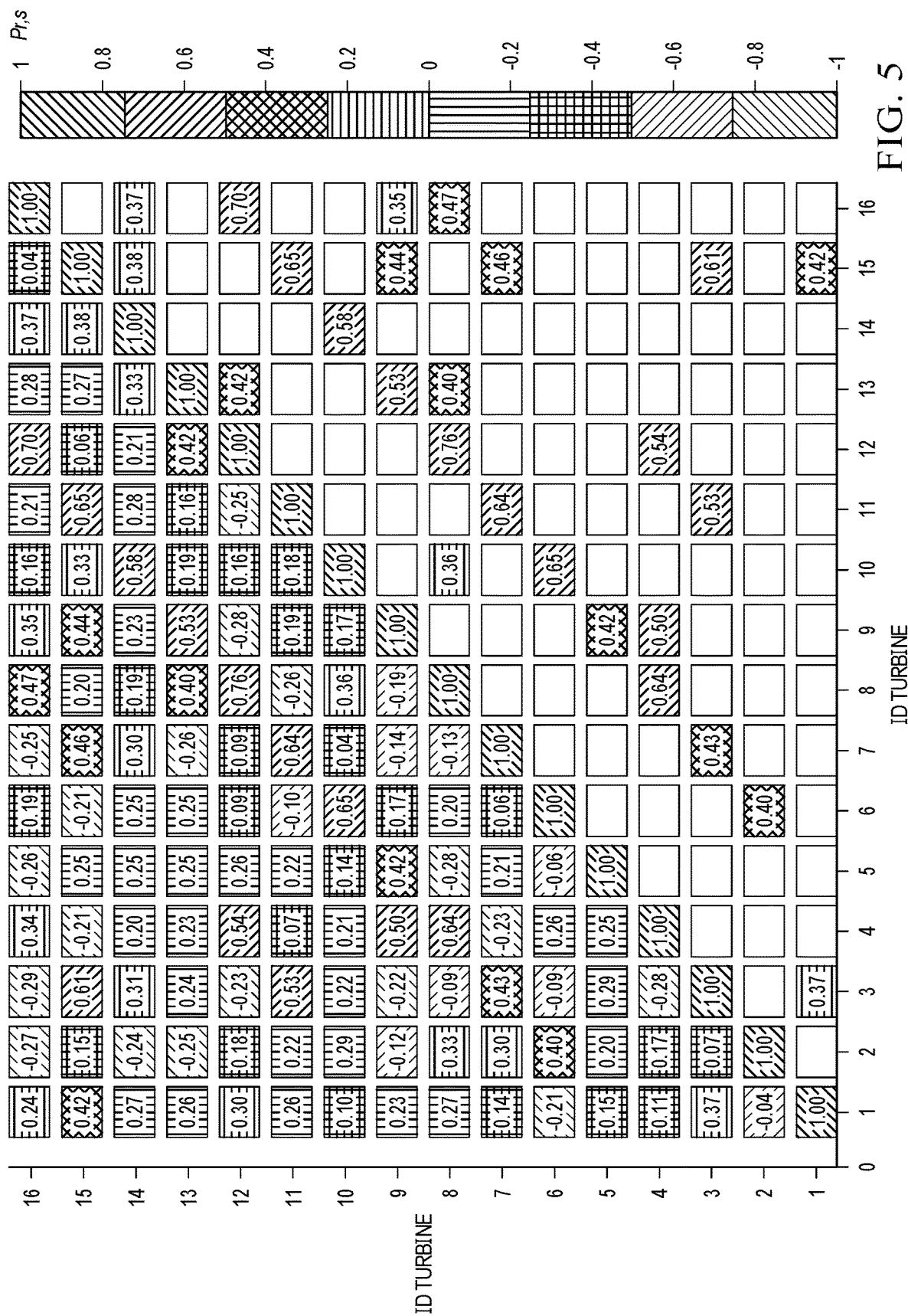
FIG. 5 depicts a matrix of power correlation coefficients between turbine pairs in a wind farm with 0° incident wind.

The correlation coefficient of the power production of each pair of turbines has been calculated and shown in the cells above the diagonal of the matrix in FIG. 5 where the coordinates of the cells correspond to the pair of turbines. The value in the cell is the correlation coefficient between the two turbines (e.g., the number in cell 3-5 is the correlation coefficient between turbines T03 and T05). As discussed above, turbines correlated through the wake have a positive correlation, i.e., both turbines either increase or decrease the power production.

It can be assumed that the correlation associated with the wake interaction is higher than the one due to the remaining turbulent coherent structures (not filtered by _*). In fact, a turbine is in the wake of another until the wind changes direction. On the other hand, very large turbulent coherent structures have random orientation, meander and are not persistent in a particular position as the wakes. As a consequence two turbines are affected by the same turbulent structure for a much shorter time than those in each other's wake.

For the practical identification of the clusters, a threshold value of correlation, $\rho_{th}$ can be set: a pair of turbines with a correlation greater than the threshold are more likely to be coupled by the wake. The value of the threshold $\rho_{th}$ may vary with the wind direction. When the wind direction changes, the distance between two turbines coupled by the wake changes (by a factor $1/\cos\theta$ with respect to the $\theta=0°$ reference case). The threshold is also expected to vary according to the wind farm layout; a one-time tuning will be then required for each different wind farm. Because of the viscosity and turbulent transport, the correlation between the two power signals is expected to decrease by increasing the distance between the turbines. Hence, a different threshold value has to be determined for each wind direction. To provide a general procedure, $\rho_{th}$ is determined such that the Cumulative Distribution Function (CDF) of peak correlation coefficients is 0.85 at $\rho_{th}$. This means that only the highest 15% correlation coefficients are considered as indicative of turbine pairs.

Figure 7:
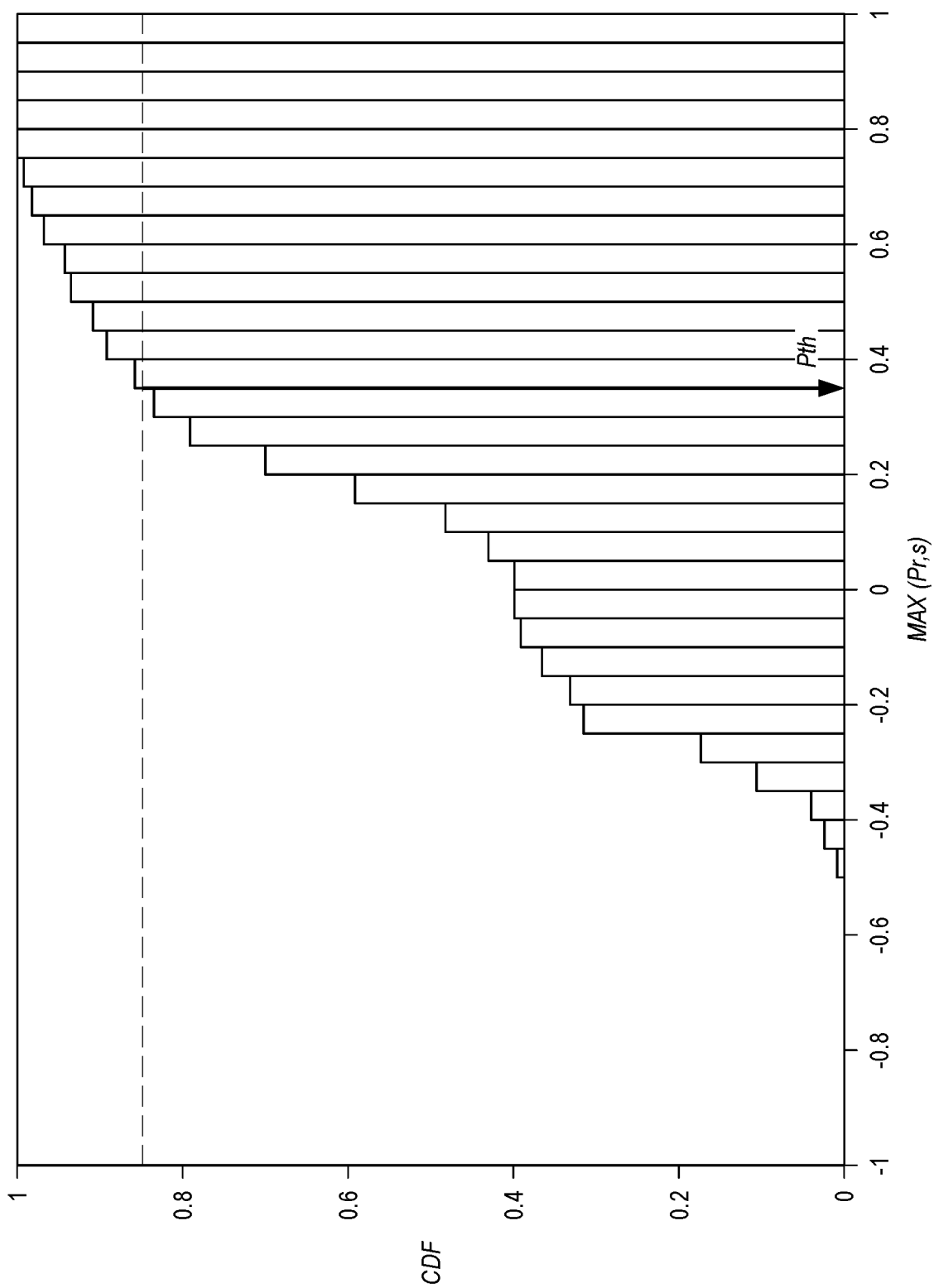
FIG. 7 depicts a chart for determining a threshold of correlation coefficients to identify turbine clusters in accordance with an illustrative embodiment.

FIG. 7 reports as an example the CDF associated with 0° wind direction. The figure shows the percentage of pairs of turbines that exhibit a correlation maximum value smaller than the one associated with each bin. The threshold value is $\rho_{th}=0.35$ since the bin associated with this value is the first that exceeds a CDF value of 0.85. Different thresholds have been tested. Larger values would discard pair of turbines in each other's wake, smaller values would potentially lead to many outliers with correlation due to the turbulence in the wind.

The lower portion of the matrix in FIG. 5 shows the correlation coefficients such that $\rho_{r,s}>\rho_{th}$.

Figure 8:
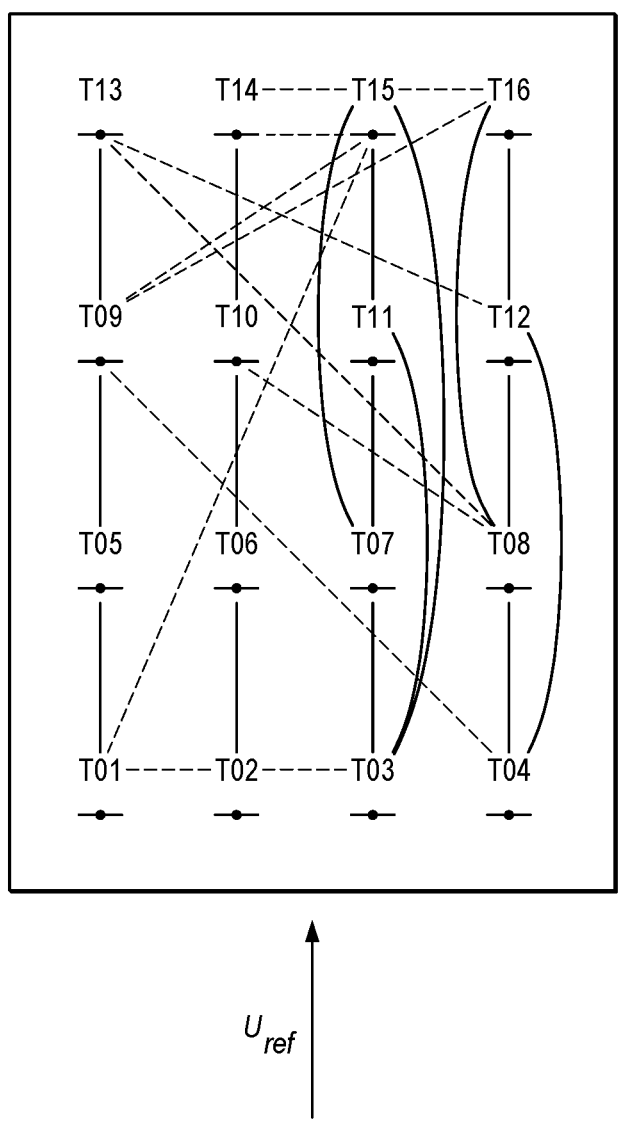
FIG. 8 depicts a diagram illustrating wake interaction between turbines in a wind farm with 0° incident wind.

Those cells represent the pairs of turbines that are strongly correlated in the time window considered. By drawing a link between each pair of turbines, the clusters can be identified as shown in FIG. 8. The pairs of turbines of the 2nd, 3rd and 4th rows in wake conditions show a higher correlation than the pairs in the 1st and 2nd rows. A dominant direction of the links is evident from FIG. 8. However, outliers indicated by dashed lines are present.

Figure 6:
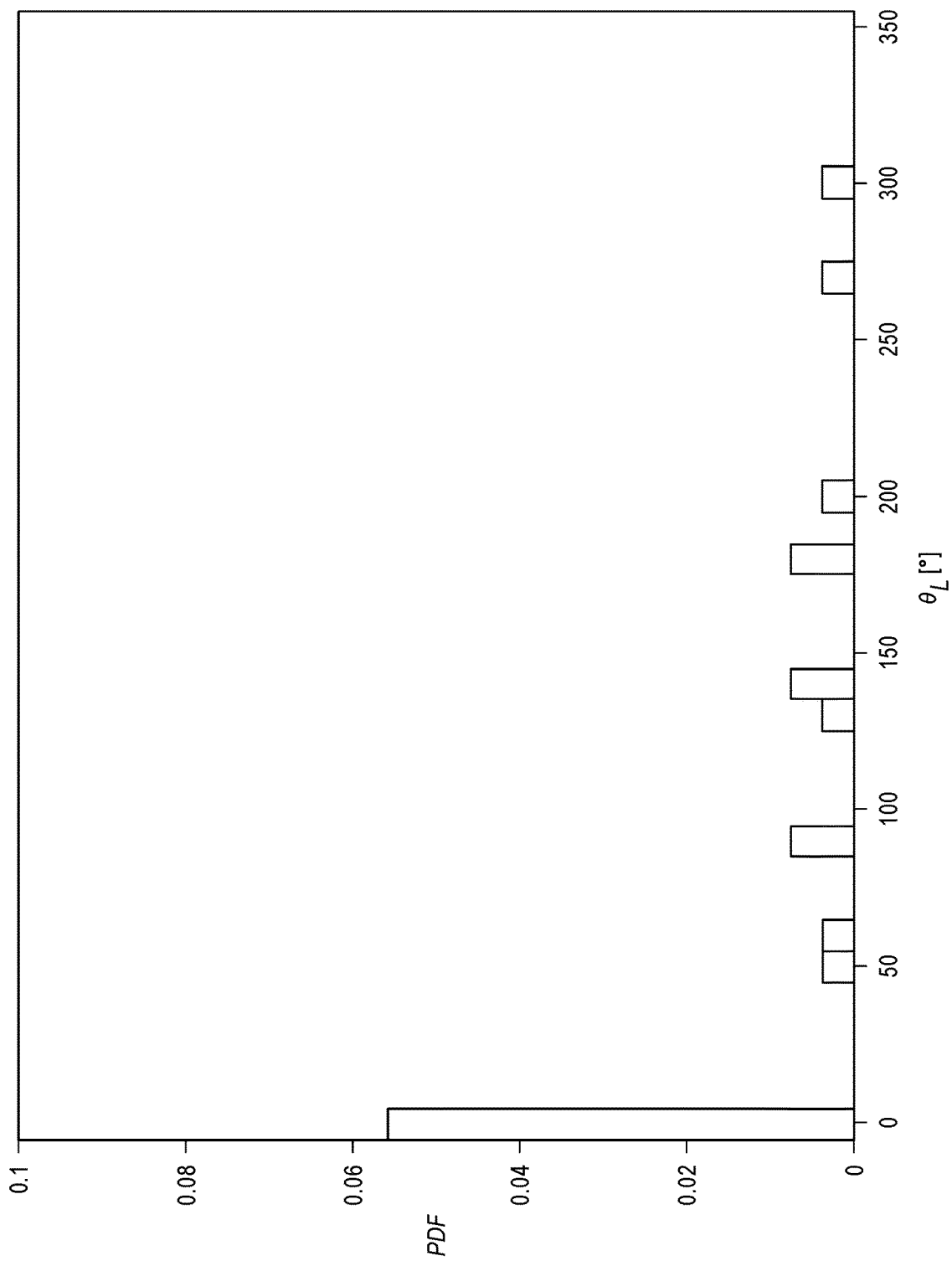
FIG. 6 depicts a chart of the probability density function of the northing directions associated with correlated turbine pairs in each wind sector of a wind farm in accordance with an illustrative embodiment.

Another physical property of the wakes can be used to eliminate these outliers. The wakes are aligned with the wind direction, or in case of yaw misalignment, are within ±10° (larger misalignment would be unreasonable due to the penalty in power production). Typically, the wind direction does not change much locally within a sector of a farm. Thus, the wakes (and links) should all be within ±10° degrees of a particular direction. Each link of FIG. 8 corresponds to a particular direction which can be easily calculated from the knowledge of the coordinates of the turbines. We counted the number of links in each 10° sector. Then, we computed the PDF of the link directions dividing the number of links in each 10° sector by the total number of the links in FIG. 8, i.e., 26, and normalizing with the bin width, i.e., 10. The PDF of the link directions should indicate the most probable wake direction as shown in FIG. 6. A peak is obtained for the link direction $\theta_L=0°$. Therefore, only the pairs of turbines that are in the direction $\theta=0°\pm10°$ can be considered coupled by the wake interaction while all the other pairs are correlated by other causes such as free-stream turbulence.

The method has been demonstrated to work well for 0° wind direction. As shown in FIG. 8, the links and clusters identified by the method are consistent with the color contours of the velocity. We remind the reader that the flow visualization is used only as a benchmark and not to determine the clusters. The weak asymmetry that can be observed in Figure is due to the fact that the incoming flow is not symmetric, but it has turbulence. The effect of turbulence would cancel out if the statistics were computed over large temporal windows. However, the method to be effective for practical applications needs to be faster than the wind variability. As a compromise, we choose to calculate the correlations, equation (6), with a running average of the last 30 minutes of operations. This time window can be tuned once for each wind farm, given the wind variability at the specific site. Here, we further validate the proposed approach by applying it to other wind directions: 30°, 60°, and 90°. For each different wind direction, the clusters of turbines change and the spacing between turbines in the clusters varies with a consequent different wake recovery.

Figure 10:
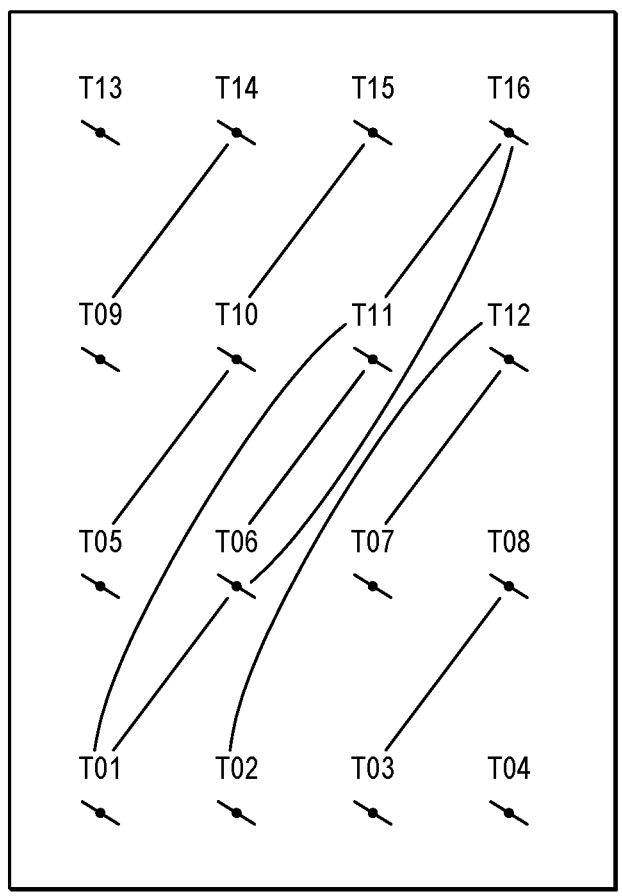
FIG. 10 depicts a diagram illustrating wake interaction between turbines in a wind farm with 30° incident wind.
Figure 10:
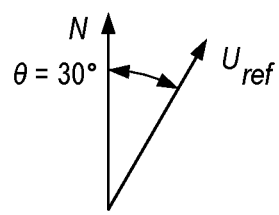

The cells above the diagonal of the matrix in FIG. 9 show the correlation coefficients for each pair of turbines when the wind direction is 30°. To filter out the pairs of turbines correlated by the turbulence, $\rho_{th}$ is chosen such that the cumulative distribution function is $CDF(\rho_{th})=0.85$. As a result, only the pairs associated with the colored boxes under the diagonal are left. However, some coherent turbulent structures in the incoming wind can have a timescale of the same order of the window, where we compute the statistics and induce correlation in the power production of turbines that do not belong to the same cluster. As a consequence, not all the turbine pairs left under the diagonal of the matrix of FIG. 9 are actually coupled by the wake interaction. The link connecting each pair of turbines corresponds to a particular direction, $\theta_L$, which can be easily calculated from the knowledge of the coordinates of the turbines. We counted the number of links in each 10° sector, and we computed the PDF of the link directions. The PDF of the link directions should indicate the most probable direction in which the pairs of turbines are correlated. The PDF of the directions associated with the pairs of turbines with $\rho>\rho_{th}$ has a peak at $\theta^*_L=30°$. Hence, the network of coupled turbines is drawn considering only the correlated pairs that are aligned in the direction $\theta_L\in[20°,40°]$. Pairs of correlated turbines in this interval that are spaced more than 12D apart are removed as well. For example, using only the data from FIG. 9, T01 would be linked with T06, T11, T16, and T12. However, for yaw control purposes, only the link with T06 is considered relevant. The resulting network is shown in FIG. 10. The pair T02-T07 is coupled by the wake interaction even if the link in the network in FIG. 10 is missing, illustrating the sensitivity to the threshold value $\rho_{th}$. However, if, for example, $\rho_{th}$ is reduced such that the pairs with the top 20% correlation coefficients are retained, the pair T02-T07 would be identified. This suggests that one-time fine tuning of $\rho_{th}$ on the wind direction would improve the efficacy of the method even further.

Figure 12:
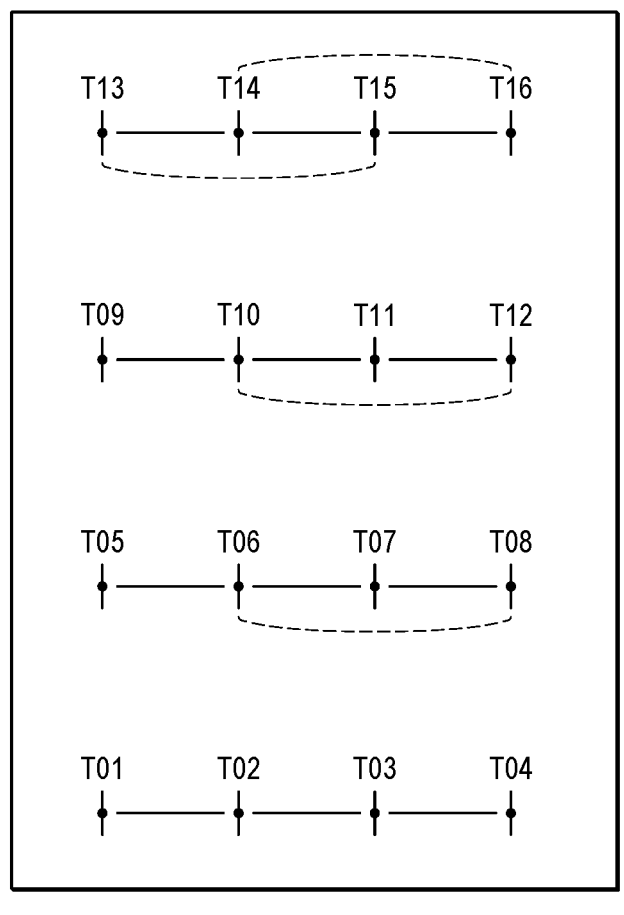
FIG. 12 depicts a diagram illustrating wake interaction between turbines in a wind farm with 90° incident wind.

A similar analysis is presented for the case with 90° wind direction. The correlation coefficients for each pair of turbines are shown over the main diagonal of FIG. 11 while only the pairs with $\rho_{r,s} > \rho_{th}$ are reported under the main diagonal. The PDF of the directions of the links exhibits a dominant peak for $\theta_L=90°$. The network of aerodynamically coupled turbines obtained with the proposed method is shown in FIG. 12. For this case, the peak in the PDF is higher than that for 30° wind direction with very few outliers. This very good performance of the method for this wind direction is due to the small separation of the turbines in the streamwise direction. Thus, the wake of upstream turbines does not recover before impinging on the downstream turbines. This leads to higher correlation coefficients and a better identification with respect to all the other cases.

Figure 13:
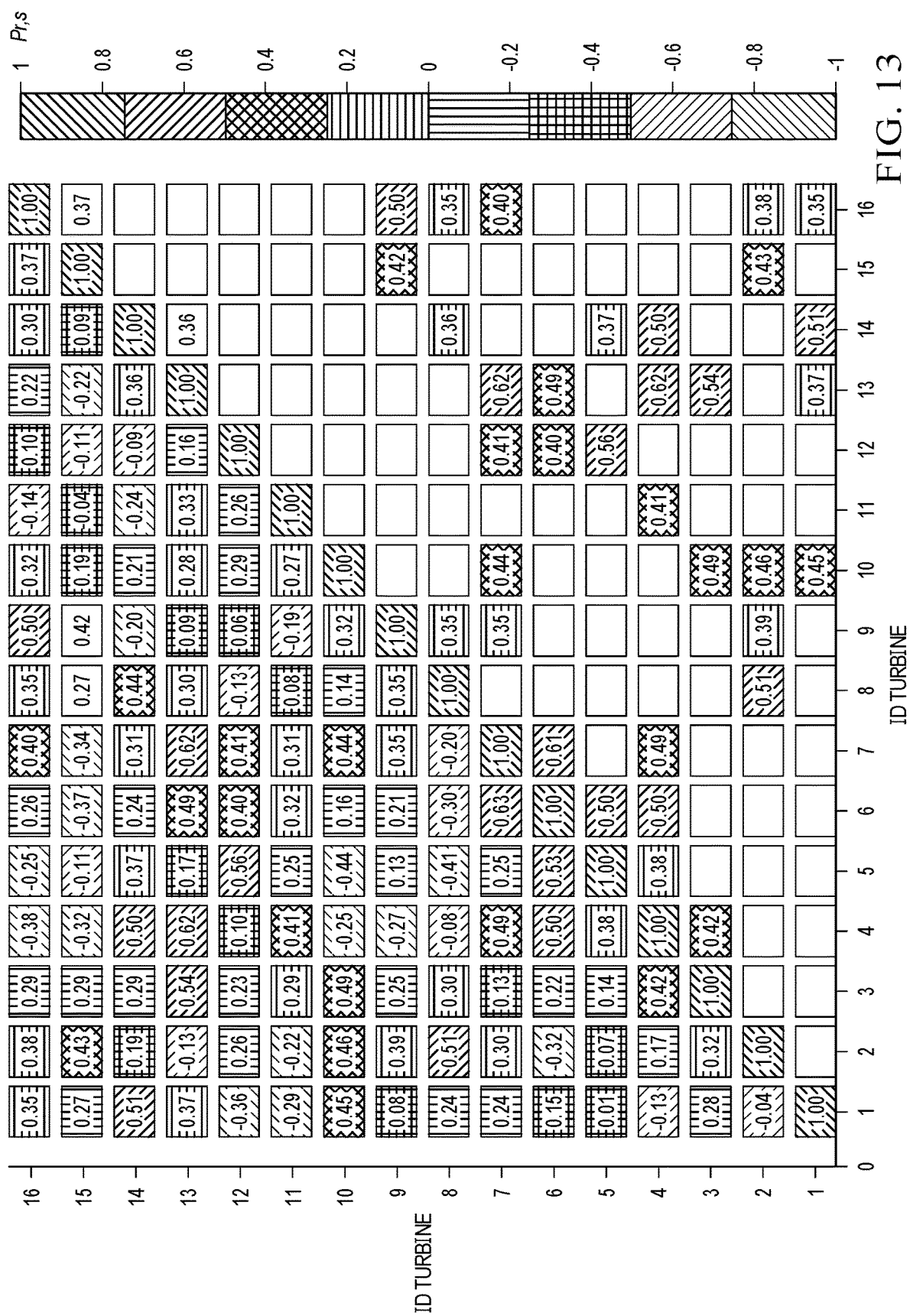
FIG. 13 depicts a matrix of power correlation coefficients between turbine pairs in a wind farm with 60° incident wind.

For 60° wind direction, the pairs that are aligned with the wind direction are T01-T08, T05-T12, and T09-T16. The distance between these pairs of turbines is 10D, about twice the distance between T01 and T05 for 0° wind direction. As a consequence, the wake recovery is enhanced and the correlation between the power productions of two consecutive turbines is smaller. For example, for 90° wind direction, the correlation between the first two turbines (T01-T02, T05-T06, T09-T10, and T13-T14) ranges between 0.58 and 0.74. On the other hand, for 60° wind direction, the correlation of the first pair of turbines ranges between 0.24 and 0.56. FIG. 13 shows in the area over the diagonal the correlation coefficients between pairs of turbines while under the main diagonal only the pairs with $\rho_{r,s} > \rho_{th}$ are left. Some of the pairs of turbines with $\rho_{r,s} > \rho_{th}$ are not aligned with the wind direction, but the external region of the wake almost reaches the boundary of the rotor disk (for instance, the wake of T03 is very close to the rotor of T04).

Because of the reduced distance between the turbines, their power signals could show higher correlation than those aligned with the wind direction. For instance, the pair T01-T08 is separated by about 10D and has smaller correlation coefficient ($\rho_{1,8}=0.24$) than the pair T03-T04, which is not aligned with the wind direction ($\rho_{r,s}=0.42$). The wake of T05 does not appear to directly impinge on T06. However, the closeness between the wake of T05 and the turbine T06 causes a strong interaction. Additional pairs of turbines show high peak values of the correlation coefficient even if they are separated by a large distance as, for example, T01-T10, T01-T14, T04-T07, T04-T13, and T07-T13. For this particular wind direction, 10 turbines face the undisturbed wind when compared to four for the 90° wind direction case. Thus, the fluctuation of the power production of each of those pairs of turbines is due to the inflow turbulence rather than to turbines wakes. To a smaller extent, this happens also for the case with 30° wind direction (Seven turbines facing the undisturbed wind). However, in that case the PDF of the directions has a clear peak. For 60° wind direction instead, the PDF of the directions associated with pairs of correlated turbines is very broad without a dominant peak.

Figure 14:
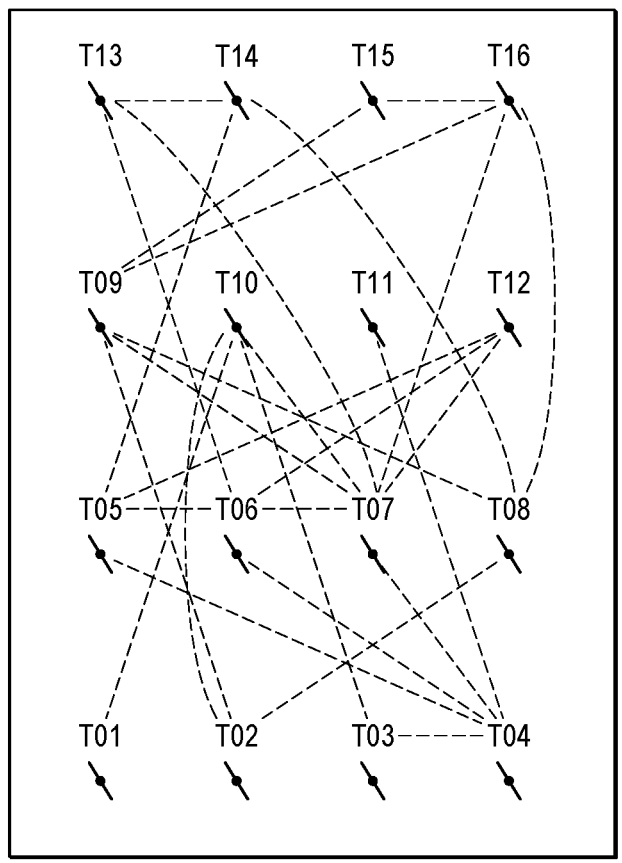
FIG. 14 depicts a diagram illustrating wake interaction between turbines in a wind farm with 60° incident wind.
Figure 14:
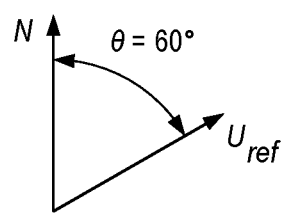

As a consequence, the criteria "3" which filters outliers cannot be applied here, and the network of turbines does not identify a clear wake direction or clusters as shown in FIG. 14. Dashed lines highlight pairs of correlated turbines that are rejected from the criterion 3. Almost all the turbines act as if they were in free-stream conditions as shown in the table in FIG. 15 where the power production of each turbine of the wind farm is reported for every wind direction tested. For wind direction at 0°, 30°, and 90°, the turbines belonging to a cluster show a significant reduction in the average power production (because in waked conditions). In the case with 60° wind direction, only T08, T12, and T16 present a slight reduction of power production, much smaller than those relative to the other wind directions. This suggests that it is not the method used to identify the clusters that fail but instead, for this wind direction there are no well-defined clusters, and thus, yaw control optimization of columns of turbines would not be effective.

Once the clusters are identified, we proceed to the optimization of their power production, as in a real wind farm. We consider the four wind directions $\theta=0°$, $\theta=30°$, $\theta=60°$, and $\theta=90°$. A yaw misalignment has been imposed to the most upstream turbine of each cluster.

For $\theta=0°$, 4 clusters were identified as discussed extensively in Bernardoni et al. and briefly reported above. Instead of optimizing a system with 16 turbines, we optimize the four clusters with four turbines each. We recall the reader that the optimization of the clusters can be run in parallel since disturbances (changes in operating conditions) to a turbine in one cluster do not significantly affect turbines in other clusters.

The turbines T01, T02, T03, and T04 are the most upstream of each cluster. A yaw misalignment between the local wind direction and the normal to the rotor plane $\psi \in [-30°, -20°, -10°, 10°, 20°, 30°]$ is applied to these turbines. The average power production of each turbine is then compared with the baseline case (no yaw misalignment $\psi=0°$). The same turbulent inflow (same precursor simulation) is imposed at the inlet of all simulations to have a consistent comparison. The yaw misalignment imposed to T01, T02, T03, and T04 partially deflects their wakes away from T05, T06, T07, and T08, respectively.

When a yaw misalignment of $\psi=-20°$ and $\psi=+20°$ is imposed to the most upstream row of turbines the power production of the first row of turbines, T01, T02, T03, and T04 decreases by approximately 12% in both cases. However, the increase in power production on the second row of turbines overcomes the loss on the first row and the total power increases. The best performance is found for $\psi=-20°$ with the increase in power production ranging between 3% and 7%. The power production of the entire array increases by about 4%, which is smaller than that for each pair of turbines because averaged out over the entire array (and two rows were not optimized). However, even by yawing only the first row of turbines and optimizing the individual clusters instead of the entire system, a significant increase in power production is obtained, which is promising on the effectiveness of the proposed technique.

The increase in power production is not symmetric with respect to the yaw angle. The asymmetry of the cumulative power production with respect to the sign of the yaw angle is a known phenomenon for a single column of aligned turbines. However, for the present configuration, the sign of the most beneficial yaw angle depends on the spanwise location of the cluster inside the wind farm. For instance, T05 increases the power production of 60% for $\psi_{T01}=-20°$ and 39% when $\psi_{T01}=+20°$. On the contrary, T08 experiences a larger power increase when $\psi_{T04}=+20°$ ($P_{T08}/P_{base}=+47\%$) with respect to the case of $\psi_{T04}=-20°$ ($P_{T08}/P_{base}=+40\%$). Thus, the different power increase among the clusters is due to the downstream row of turbines rather than the upstream row. Positive yaw angles are favorable for pairs on the East side of the wind farm, i.e., T03-T07 and T04-T08. Instead, negative yaw angles largely increase the power production of the pairs on the West side of the farm (T01-T05 and T02-T06).

The array of turbines can be thought of as a large porous rectangular bluff body to the atmospheric boundary layer flow. The pressure on the first row of turbines is higher than in the surrounding and causes stream of fluids to tilt toward the sides, in the direction of least resistance. The upstream influence of the wind farm on the incoming flow is usually referred to as wind farm blockage.

A negative spanwise velocity (Westward) is observed in front of turbines T01 and T02, while a positive spanwise velocity (Eastward) is in front of T03 and T04 1.5D upstream the first row of turbines. Hence, the blockage effect consistently changes the local wind direction of a few degrees with opposite sign at the two sides of the wind farm even if the prevailing wind direction is uniform upstream of the wind farm. Downstream the yawed turbine, the wake gradually tends to realign itself to the local prevailing flow direction.

However, if the rotor is yawed consistently with the spanwise velocity induced by the blockage, the wake realigns further downstream. Hence, the power production on the trailing turbine is larger. For example, when the turbine is yawed $\psi=+20°$, the wake tilts Eastward. Therefore, the blockage effect is favorable to the wake steering of T03 and T04 (in the same direction). On the other hand, on turbines T01 and T02, the blockage effect induces a flow in the opposite direction to the wake steering. In fact, the wakes of T01 and T02 are only slightly steered away from the downstream turbine in the cluster. The opposite occurs for a yaw angle of $\psi=-20°$, the blockage being beneficial to T01 and T02 and detrimental to T03 and T04. To summarize, the wake has to be steered consistently with the blockage effect, negative yaw on T01 and T02, and positive on T03 and T04. This effect could not be observed before in ideal studies of one single column of turbines.

To assess the potential of yaw control, the entire cluster T03-T07-T11-T15 has been optimized. To isolate the power improvement of this cluster, all the other turbines of the wind farm were operated in the baseline condition, i.e., with no misalignment respect to the wind direction. In the following paragraph, we will proceed with a step-by-step optimization process by first optimizing the group of turbines T03-T07-T11 and then the entire cluster T03-T07-T11-T15. From the optimization of the pair T03-T07, we have observed a maximum increase in power production when T03 is yawed of $\psi_{T03}=+20°$. Therefore, the yaw misalignment of T03 is kept constant and equal to $\psi_{T03}=+20°$, and the yaw angle of turbine T07 is varied between $-20°$ and $+20°$ while no misalignment is applied to T11 and T15.

For the turbine group T03-T07-T11 with respect to the baseline the asymmetry of the power production variation of the group with respect to the sign of $\psi$ is due to the different interaction between the wake of T03 and the turbine T07. When $\psi_{T07}=-20°$, i.e., opposite to $\psi_{T03}=+20°$, the power production of T07 increases by about 65%. However, the power production of T11 decreases by about 24%. In fact, the wake of T07 is steered westward (since $\psi_{T07}<0$) while the wake of T03 is deflected eastward (since $\psi_{T03}>0$). The wake impinging on T11 is the coalescence on the two wakes of T03 and T07, resulting in a wider low momentum region. Thus, the turbine T11 faces a much less energetic flow with respect to the baseline case.

As a consequence, the power production variation of the group T03-T07-T11 with respect to the baseline is almost negligible [$(P_{03}+P_{07}+P_{11})/P_{base}=+0.1\%$], despite the significant power increase in T07. When instead $\psi_{T07}=+20°$, i.e., in the same direction of the yaw misalignment of T03, the turbine T07 increases the power production by about 28% and the power of T11 increases as well by about 41%. Overall, the cumulative power production of the group T03-T07-T11 increases by 9.6%.

The best performance of the group T03-T07-T11 is obtained for $\psi_{T07}=+20°$. Therefore, for the next step, we kept constant $\psi_{T03}=\psi_{T07}=+20°$ and imposed different misalignment angles to the turbine T11 in order to optimize the power production of the entire cluster T03-T07-T11-T15. No yaw misalignment is imposed to T15. The increase in power production $\Delta P=P-P_{base}$ normalized with respect to the baseline condition. Since the power production varies in time, we also plotted an error bar representing the standard deviation $\sigma_{\Delta P}$, $$\sigma_{\Delta P} = \sqrt{\frac{1}{N_t}\sum_{i=1}^{N_t}(\Delta P_i - \mu_{\Delta P})^2}, \quad (7)$$

where $N_t$ is the total number of time samples and $\mu_{\Delta P}$ is the mean power gain represented by the solid dots in the figure. Different upstream turbulent intensities may affect the variability of the power production and, hence, the size of the error bars.

The optimal operating condition, that is the one with the largest power production, is the configuration with $\psi_{T03}=\psi_{T07}=\psi_{T11}=+20°$. A yaw misalignment of about 20° was also found as best performing for an array on six aligned turbines with a streamwise spacing of 4.2D. With this configuration, the cluster of the four turbines increases the power production by 9.1%. All turbines were optimal at $\psi=+20°$. However, for $\psi_{T11}=+10°$, the increase in power is basically the same as that obtained with $\psi_{T11}=+20°$, which could indicate that the optimal yaw angle could be slightly smaller than 20°. As observed before, the best performance is achieved when the wakes are consistently steered in the same direction through the entire cluster.

The cumulative power of the cluster T03-T07-T11-T15 increases when the yaw misalignment is imposed to a different number of turbines. In particular, the variation goes from +4.6% when yaw-misalignment is applied only to T03 ($\psi_{T03}=+20°$), to +6.3% when both T03 and T07 are yawed ($\psi_{T03}=\psi_{T07}=+20°$), and finally to +9.1% when $\psi_{T03}=\psi_{T07}=\psi_{T11}=+20°$. Thanks to the wake steering of the upstream turbine, both T07 and T11 increase their power production, despite their misalignment with the wind direction. The power increase in T15 is the largest because it is in the optimal configuration aligned with the wind direction and the wake of T11 is deflected away.

For the 30° wind direction case, the clusters of turbines are T01-T06-T11-T16, T02-T07-T12, T03-T08, T05-T10-T15, and T09-T14. Yaw misalignment has been applied to the upstream turbines of each cluster and the cumulative power production of the first two turbines has been evaluated. Similar to 0° wind direction, the curves are not symmetric. However, in this case, negative yaw angles ($-\psi_i$) increase the power production more than the corresponding positive yaw angle ($+\psi_i$) for all the clusters. In fact, while for the 0° wind direction, the blockage of the entire farm was the main factor affecting how much the yaw misalignment was effective in tilting the wake. For this wind direction, the clusters are much closer and it is the local flow around the turbines to determine the direction of the wake. The spanwise distance between the wakes is, in this case, 3D cos (30°) 2.6D.

When each rotor is perpendicular to the wind ($\psi_i=0°$) each turbine induces in front of the rotor a negative spanwise velocity on the left side and a positive spanwise velocity on the right side as a consequence of the thrust of the rotor. For a negative yaw angle, ψ<0°, the wake is deflected westward (negative spanwise direction z). If we consider, for example, T01, the closest turbine, T02, induces a pressure gradient and then spanwise velocities that tend to steer the wake in the same direction. Hence, the wake steering of T01 in the westward direction is enhanced by the presence of the induction zone of T02. As a result, the wake is significantly tilted and the rotor of the trailing turbines, T06, is only partially in the wake of T01 with a consequent power increase.

A positive yaw angle, ψ>0°, on the other hand, tilts the wake eastward (positive z). However, the induction from T02 (that pushes the wake in the negative z direction) tends to realign the wake to the wind direction. As a consequence, the wake is not steered away from T06 and the power does not increase much. It must be also noted that the wake of T01 is very close to T05, which induces positive spanwise velocity, in the opposite direction of the wake steering for ψ<0°. The two effects of T02 and T05 on the wake of T01 do not compensate, despite they are in opposite directions. Because T02 is located much upstream, its effect on the wake of T01 is much stronger than the effect of T05. Indeed, T02 induces negative spanwise velocity right after the rotor of T01. The presence of T02 both boosts the wake steering at a very early stage and enhances the wake recovery process. On the other hand, the turbine T05 induces positive spanwise velocity farther downstream in a region where the wake of T01 is already steered and partially recovered. Thus, the presence of the induction zone of T02 helps to steer the wake of T01 toward negative z-direction in much stronger way than the induction region of T05 does in the opposite direction.

The same phenomena apply also for the other turbine pairs. Hence, in this configuration, negative yaw misalignment is beneficial for all the clusters of the wind farm in contrast with the case of θ=0° where the sign of the most beneficial yaw misalignment depended on the blockage effect of the wind farm.

In the case of θ=90°, T01, T05, T09, and T13 are the leading turbines of each cluster. Different yaw misalignments to these turbines have been applied to optimize the cumulative power production of the pairs T01-T02, T05-T06, T09-T10, and T13-T14. The best performances are obtained when ψ=±20°/30°. In this case, the curves are symmetric to some approximation. Indeed, for this wind direction, the blockage effect of the wind farm is much reduced with respect to the case with θ=0° since the distance between the clusters in the direction perpendicular to the wind is much larger (5D instead of 3D in the case with θ=0° and 2.6D for θ=30°). Therefore, the effect of the sign of the yaw angle in this configuration is almost negligible. In order to test the yaw optimization strategy over the entire wind farm, we imposed to each cluster a yaw misalignment equal to the most beneficial ψ of the respective pair of turbines. The same yaw misalignment of the upstream turbine was applied to all the turbines of each cluster except for the most downstream one since we demonstrated that this is the best strategy to apply when optimizing a cluster for the case θ=0°. Thus, the wind farm power production was tested by imposing $\psi_{T01}=\psi_{T02}=\psi_{T03}=-20°$, $\psi_{T05}=\psi_{T06}=\psi_{T07}=30°$, $\psi_{T09}=\psi_{T10}=\psi_{T11}=-30°$, and $\psi_{T13}=\psi_{T14}=\psi_{T15}=-20°$. The overall power production of the wind farm increases by 10.4% with respect to the baseline conditions in which each turbine is aligned with the wind direction. The maximum power increase is of 16.8% for the cluster composed of T05, T06, T07, and T08 while the minimum power increase is of 6.3% for the cluster composed of T01, T02, T03, and T04.

Similar results were obtained by Howland et al. in a field campaign with an array of six aligned turbines with a streamwise spacing of about 3.5D. They found that the cumulative power production of the array increases by about 7% at an average wind speed of 0.5 times the rated speed of the turbines. However, the turbulent intensity during the measurements period for a more accurate comparison is unknown.

For 60° wind direction, clusters were not identified because the rather weak correlation between the power signals of the turbines discussed above. However, it could be argued that there are three pairs of turbines that are aligned with the wind direction: T01-T08, T05-T12, and T09-T16, where T08, T12, and T16 are in the wake of T01, T05, and T09, respectively, and there is some opportunity for power production optimization. We assessed the power production change of the clusters T01-T08, T05-T12, and T09-T16 by yawing the upstream turbine (ψ ∈[−30°:+30°]) and comparing the results with the baseline. The maximum gain (+1.8%) is obtained from the pair T09-T16 for ψ=−20°. For the same yaw misalignment, all the other pairs decrease their power production: T01-T08-2.6% and T05-T12-0.9%. In general, the cumulative power of each pair of turbine shows a negligible variation or a decrease with respect to the baseline. The power production of the farm decreases for all yaw angles, given the turbines except for ψ=10° for which the variation is +0.3% and for ψ=20°, which basically produces the same power as the baseline.

It could have appeared that the proposed method to find the clusters failed for this wind direction. However, the method did not fail, but rather indicated that yaw optimization is not effective for this wind direction. In other words, the cumulative power production of any pair of turbines does not increase if yaw misalignment is applied to the most upstream turbines. Indeed, the fact that a group of turbines is aligned with the wind direction does not necessarily imply that yaw control may increase their cumulative power production. In the case with 60° wind direction, the larger spacing of the turbine along to the wind direction allows the wake to almost completely recover. Thus, the coordinated yaw misalignment is ineffective at maximizing the power production.

Figure 16:
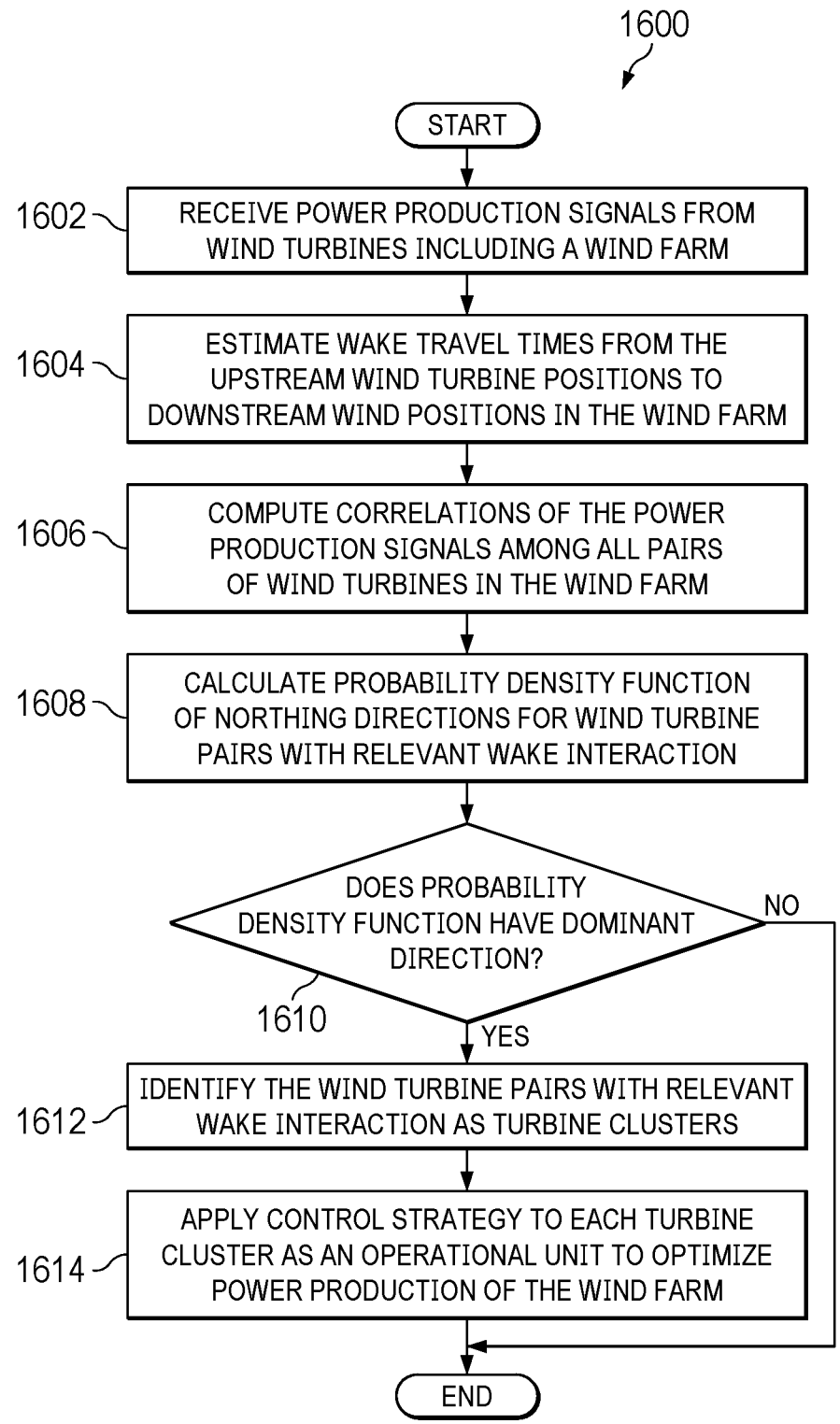
FIG. 16 depicts a flowchart of a process for merging datasets in accordance with an illustrative embodiment.

Turning next to FIG. 16, a flowchart of a process for merging datasets is depicted in accordance with an illustrative embodiment. The process in FIG. 16 can be implemented in hardware, software, or both. When implemented in software, the process can take the form of program instructions that is run by one of more processor units located in one or more hardware devices in one or more computer systems. Process 1600 may be implemented in wind turbine control environment 100 using turbine control manager 136 in computer system 102 in FIG. 1.

Process 1600 begins by receiving power production signals from wind turbines comprising a wind farm (step 1602). The wind farm may have a turbine grid designed with a streamwise direction or a spanwise direction. Process 1600 estimates wake travel times from upstream wind turbine positions to downstream wind turbine positions in the wind farm (step 1604).

Process 1600 computing correlations of the power production signals among all pairs of wind turbines in the wind farm (step 1606). At this step, a pair of turbines may comprise any two wind turbines in the wind farm. Wind turbines with a power production correlation above a specified threshold at an expected time (based on estimated wake travel time) are considered to have wake interaction. The specified threshold may be based on layout of the wind farm and wind direction. Wind turbine pairs with wake interaction may comprise pairs of wind turbines with an angle within 20 degree of wake direction. Wind turbine pairs with wake interaction may also comprise wind turbines that are spaced apart less than 12 rotor diameters from each other.

Process 1600 then calculate a probability density function of northing directions for the wind turbine pairs with wake interaction (step 1608) and determines whether the probability density function has a dominant direction (step 1610). The probability density function counts the number of northing directions, $\theta_L$, associated with correlated turbine pairs in each wind sector. We can conservatively consider that the wakes of the turbines will have a consistent direction throughout the array, and it is unlikely that the wind direction changes significantly in the neighborhood of the turbine. We use this hypothesis to filter outliers that may be due to very large turbulent structures. For only the turbine pairs identified in the previous steps, we compute the northing angle, $\theta_L$, of the line that links the two turbines with respect to the North direction. We then compute the probability density function (PDF) of $\theta_L$ distribution to find the most probable wake direction $\theta^*_L$.

If the probability density function of northing directions does not have a dominant direction the wind farm is working in optimal conditions with no need to apply an addition control strategy. Therefore, process 1600 ends.

Responsive to the probability density function having a dominant direction, process 1600 identifies the wind turbine pairs with wake interaction as turbine clusters (step 1612) and applies a control strategy to each turbine cluster as an operational unit to optimize power production of the wind farm (step 1614). The control strategy may comprise one of yaw misalignment of upstream turbines for wake steering or derating of upstream turbines to increase the power production of downstream turbines. Process 1600 then ends.

Figure 17:
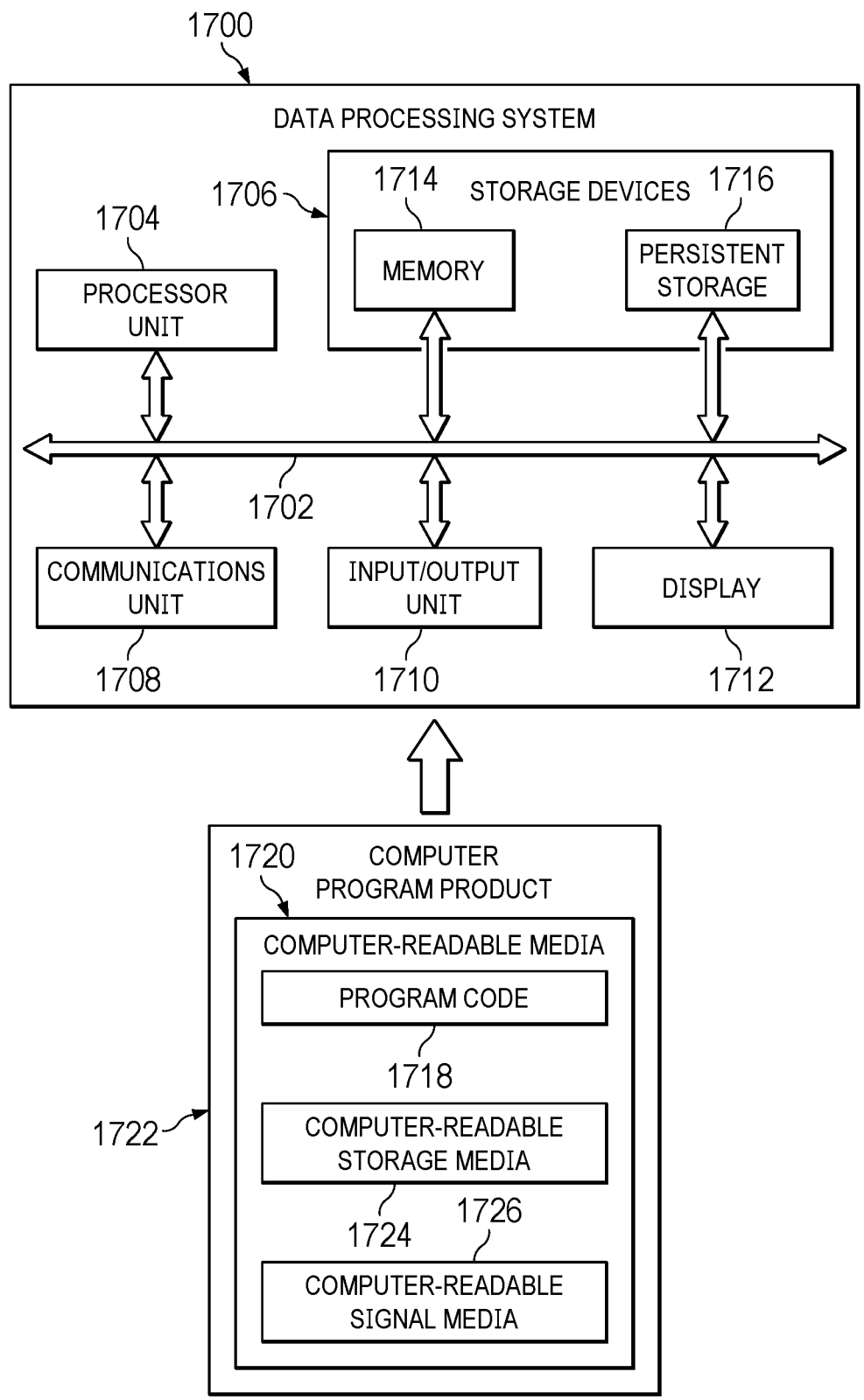
FIG. 17 is a block diagram of a data processing system is depicted in accordance with an illustrative embodiment.

Turning now to FIG. 17, a block diagram of a data processing system is depicted in accordance with an illustrative embodiment. Data processing system 1700 may be used to implement computer system 102 shown in FIG. 1. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1717, which are in communication with processor unit 1704 through communications framework 1702. The processes of the different embodiments can be performed by processor unit 1704 using computer-implemented instructions, which may be located in a memory, such as memory 1706.

These instructions are referred to as program code, computer usable program code, or computer-readable program code that can be read and executed by a processor in processor unit 1704. The program code in the different embodiments can be embodied on different physical or computer-readable storage media, such as memory 1706 or persistent storage 1708.

Program code 1718 is located in a functional form on computer-readable media 1720 that is selectively removable and can be loaded onto or transferred to data processing system 1700 for execution by processor unit 1704. Program code 1718 and computer-readable media 1720 form computer program product 1722 in these illustrative examples. In the illustrative example, computer-readable media 1720 is computer-readable storage media 1724.

In these illustrative examples, computer-readable storage media 1724 is a physical or tangible storage device used to store program code 1718 rather than a medium that propagates or transmits program code 1718.

Alternatively, program code 1718 can be transferred to data processing system 1700 using a computer-readable signal media. The computer-readable signal media can be, for example, a propagated data signal containing program code 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program code 1718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method to control wind turbines in real-time, the method comprising:
   receiving, in real-time, power production signals from wind turbines in a wind farm;
   computing correlations of the power production signals among all pairs of wind turbines in the wind farm, wherein each pair of wind turbines with a power production correlation above a specified threshold at an expected time is considered to have wake interaction;
   calculating a probability density function of northing directions of the pairs of wind turbines with wake interaction;
   determining whether the probability density function has a dominant direction;
   responsive to the probability density function having a dominant direction, identifying the pairs of wind turbines with wake interaction as turbine clusters; and
   misaligning a yaw of or derating, in real-time at each turbine cluster of the turbine clusters, an upstream turbine in the turbine cluster.

2. The method of claim 1, wherein the pairs of wind turbines with wake interaction comprise pairs of wind turbines with an angle within 20 degree of a wake direction.

3. The method of claim 1, wherein the pairs of wind turbines with wake interaction comprises wind turbines that are spaced apart less than 12 rotor diameters from each other.

4. The method of claim 1, wherein the wind farm has a turbine grid designed with a streamwise direction or a spanwise direction.

5. The method of claim 1, wherein the probability density function counts a number of northing directions associated with correlated pairs of wind turbines in each sector of sectors separated by 10 degrees from a wind direction.

6. The method of claim 1, wherein the specified threshold is based on layout of the wind farm and wind direction.

7. The method of claim 1, wherein:
   misaligning the yaw of the upstream turbine steers a wake of the upstream turbine; and
   derating the upstream turbine increases a power production of a downstream turbine.

8. A method of controlling wind turbines in real-time, the method comprising:
   correlating power production signals among wind turbines in a wind farm;
   identifying wind turbine pairs in the wind farm with wake interaction, wherein wake interaction comprises a power production correlation above a specified threshold at an expected time;
   calculating a probability density function of northing directions of the wind turbine pairs with wake interaction;
   determining whether the probability density function has a dominant direction, wherein wind turbine pairs with wake interaction form turbine clusters when the probability density function has a dominant direction; and
   misaligning a yaw of or derating, in real-time at each turbine cluster of the turbine clusters, an upstream turbine in the turbine cluster.

9. The method of claim 8, wherein the wind turbine pairs with wake interaction comprise pairs of wind turbines with an angle within 20 degree of a wake direction.

10. The method of claim 8, wherein the wind turbine pairs with wake interaction comprises wind turbines that are spaced apart less than 12 rotor diameters from each other.

11. The method of claim 8, wherein the wind farm has a turbine grid designed with a streamwise direction or a spanwise direction.

12. The method of claim 8, wherein the probability density function counts a number of northing directions associated with correlated turbine pairs in each sector of sectors separated by 10 degrees from a wind direction.

13. The method of claim 8, wherein the specified threshold is determined based on layout of the wind farm and wind direction.

14. The method of claim 8, wherein:
   misaligning the yaw of the upstream turbine steers a wake of the upstream turbine; and
   derating the upstream turbine increases a power production of a downstream turbine.

15. A computer system configured to control, in real-time, power production from wind turbines, wherein the computer system comprises:
   program instructions stored on a storage device; and
   a number of processor units in communication with the storage device, wherein the number of processor units are configured to execute program instructions to:
      receive, in real time, power production signals from wind turbines in a wind farm;
      compute correlations of the power production signals among all pairs of wind turbines in the wind farm, wherein wind turbines with a power production correlation above a specified threshold at an expected time are considered to have wake interaction;
      calculate a probability density function of northing directions of the pairs of wind turbines with wake interaction;
      determine whether the probability density function has a dominant direction;
      responsive to the probability density function having a dominant direction, identify the pairs of wind turbines with wake interaction as turbine clusters; and
      misalign a yaw or derate, in real-time respectively at each turbine cluster in the turbine clusters, an upwind turbine and maximize power production of each turbine cluster in the wind farm.

16. The computer system of claim 15, wherein the pairs of wind turbines with wake interaction comprise pairs of wind turbines with an angle within 20 degree of a wake direction.

17. The computer system of claim 15, wherein the pairs of wind turbines with wake interaction comprises wind turbines that are spaced apart less than 12 rotor diameters from each other.

18. The computer system of claim 15, wherein the wind farm has a turbine grid designed with a streamwise direction or a spanwise direction.

19. The computer system of claim 15, wherein the probability density function counts a number of northing directions associated with correlated turbine pairs in each sector of sectors separated by 10 degrees from a wind direction.

20. The computer system of claim 15, wherein:
   misaligning the yaw of the upstream turbine steers a wake of the upstream turbine; and
   derating the upstream turbine increases a power production of a downstream turbine.

* * * * *